US011294917B2

(12) United States Patent
Salomon et al.

(10) Patent No.: US 11,294,917 B2
(45) Date of Patent: Apr. 5, 2022

(54) DATA ATTRIBUTION USING FREQUENT PATTERN ANALYSIS

(71) Applicant: salesforce.com, inc., San Francisco, CA (US)

(72) Inventors: Yacov Salomon, Danville, CA (US); Maria Dimakopoulou, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 710 days.

(21) Appl. No.: 16/156,018

(22) Filed: Oct. 10, 2018

(65) Prior Publication Data

US 2020/0118016 A1 Apr. 16, 2020

(51) Int. Cl.
*G06F 16/2458* (2019.01)
*G06F 16/22* (2019.01)
*G06F 17/18* (2006.01)

(52) U.S. Cl.
CPC .......... *G06F 16/2465* (2019.01); *G06F 16/22* (2019.01); *G06F 16/2462* (2019.01); *G06F 17/18* (2013.01); *G06F 2216/03* (2013.01)

(58) Field of Classification Search
CPC .. G06F 16/22; G06F 16/2462; G06F 16/2465; G06F 2216/03; G06F 17/18; G06F 16/26; G06F 16/244; G06F 16/338; G06F 16/285; G06F 16/287; G06F 16/2458; G06N 5/025; G06K 9/6228; G06K 9/6232; G06K 9/623; G06K 9/6231; G06K 9/6234; G06K 9/624
See application file for complete search history.

(56) References Cited

U.S. PATENT DOCUMENTS

| 7,433,879 B1 * | 10/2008 | Sharma | G06F 16/54 |
| 2004/0083078 A1 * | 4/2004 | Feldman | G06F 17/18 |
| | | | 702/185 |
| 2005/0027710 A1 * | 2/2005 | Ma | G06F 16/2465 |
| 2006/0167654 A1 * | 7/2006 | Keinan | G06Q 10/04 |
| | | | 702/181 |

(Continued)

OTHER PUBLICATIONS

Lundberg et al., Consistent individualized feature attribution for tree ensembles. arXiv:1802.03888. Feb. 12, 20182. (Year: 2018).*

(Continued)

*Primary Examiner* — David T. Brooks
(74) *Attorney, Agent, or Firm* — Holland & Hart LLP

(57) ABSTRACT

Methods, systems, and devices for data attribution using frequent pattern analysis are described. In some cases, data stored at a multi-tenant database server may be analyzed to understand various interactions and patterns between data attributes associated with multiple users. The multi-tenant database server may effectively cluster and/or perform calculations on attributes of the data to understand user patterns. In some examples, the multi-tenant database server may determine a change (e.g., a probability change) in the user patterns by removing one or more attributes from the data set and re-performing the analysis. By re-performing the analysis, the multi-tenant database server may attribute a value to individual pieces and combinations of the data in order to indicate the effect that each piece of data has on the analysis.

20 Claims, 10 Drawing Sheets

(56) References Cited

U.S. PATENT DOCUMENTS

2017/0140418 A1* 5/2017 Yadagiri ............ G06Q 30/0244
2017/0364819 A1* 12/2017 Yang ................... H04L 41/0636
2019/0272339 A1* 9/2019 Wang ................... G06K 9/6298

OTHER PUBLICATIONS

Cohen et al., Feature selection based on the shapley value. In other words. 2005. (Year: 2005).*
Zhu et al., "Mining Frequent Patterns with Incremental Updating Frequent Pattern Tree", Proceedings of the 6th World Congress on Intelligent Control and Automation, Jun. 21-23, 2006. (Year: 2006).*
Qiu et al., "An Improved Algorithm of Mining From FP-Tree", Proceedings of the Third International Conference on Machine Learning and Cybernetics, Shanghai, Aug. 26-29, 2004 (Year: 2004).*
Zhao et al., "Shapley Value Methodsfor Attribution Modeling in Online Advertising", arXiv:1804.05327, Apr. 15, 2018 (Year: 2018).*
Sun et al., "Using cooperative game theory to optimize the feature selection problem", Neurocomputing, vol. 97, 2012, pp. 86-93. (Year: 2012).*

* cited by examiner

DATA ATTRIBUTION USING FREQUENT PATTERN ANALYSIS

FIELD OF TECHNOLOGY

The present disclosure relates generally to database systems and data processing, and more specifically to data attribution using frequent pattern analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may receive data from a wide variety of customer devices, and may include, for example, browser data, application data, usage data, and the like. Due to the large amount and wide variety of data received by the cloud platform, determining patterns and correlations between various data sets may be difficult and time consuming. For example, in the field of frequent pattern (FP) analysis, current techniques may fail to distinguish between the relationships of particular pieces of data within a data set to the overall pattern.

DETAILED DESCRIPTION

A cloud platform may determine patterns and correlations between various data sets using frequent pattern (FP) analysis. In some cases, the cloud platform may utilize a multi-tenant database system. Data may be gathered from various users of the multi-tenant database system and may include, for example, browser data, application data, usage data, and the like. Upon gathering the data, the cloud platform may perform FP analysis on the data to determine patterns and correlations between data associated with multiple users based on various attributes (e.g., characteristics) of the data. In some examples, performing FP analysis on the data may reduce the size or complexity of the data set by for example reducing the number of attribute combinations to analyze. Furthermore, the cloud platform may determine the effect that each individual piece of data or a combination of individual pieces of the data has on the result of the FP analysis by for example using the Shapley Value equation. Stated another way, the cloud platform may determine the attribution weight of each piece of data used to determine the patterns and correlations in the FP analysis. Performing FP analysis on the data set prior to performing the attribution analysis allows the cloud platform to analyze the attribution weights of a smaller and more meaningful subset of attribute combinations.

For example, a user may wish to determine attributes in common to individuals who purchased a ticket to a particular movie. Accordingly, a user may select the desired resulting data attribute for analysis (e.g., users who purchased a ticket to a particular movie) by interacting with a user device. The FP analysis may be conducted accordingly. In some examples, the analysis may include determining patterns and correlations between various data sets by using probabilistic calculations. Subsequently, a listing of "most common" attributes may be developed and ultimately displayed to a user in a manner that is quick to decipher and easily understandable. Additionally, an attribution value may be assigned to each "most common" attribute, that indicates the extent that each attribute affected the FP analysis (e.g., the extent that each attribute contributed to the user purchasing the move ticket).

Aspects of the disclosure are initially described in the context of an environment supporting an on-demand database service. Additionally, aspects of the disclosure are described through examples of data processing workflow platforms and a multiple user multi-tenant system. Aspects of the disclosure are further illustrated by and described with reference to apparatus diagrams, system diagrams, and flowcharts that relate to data attribution using frequent pattern analysis.

Figure 1:
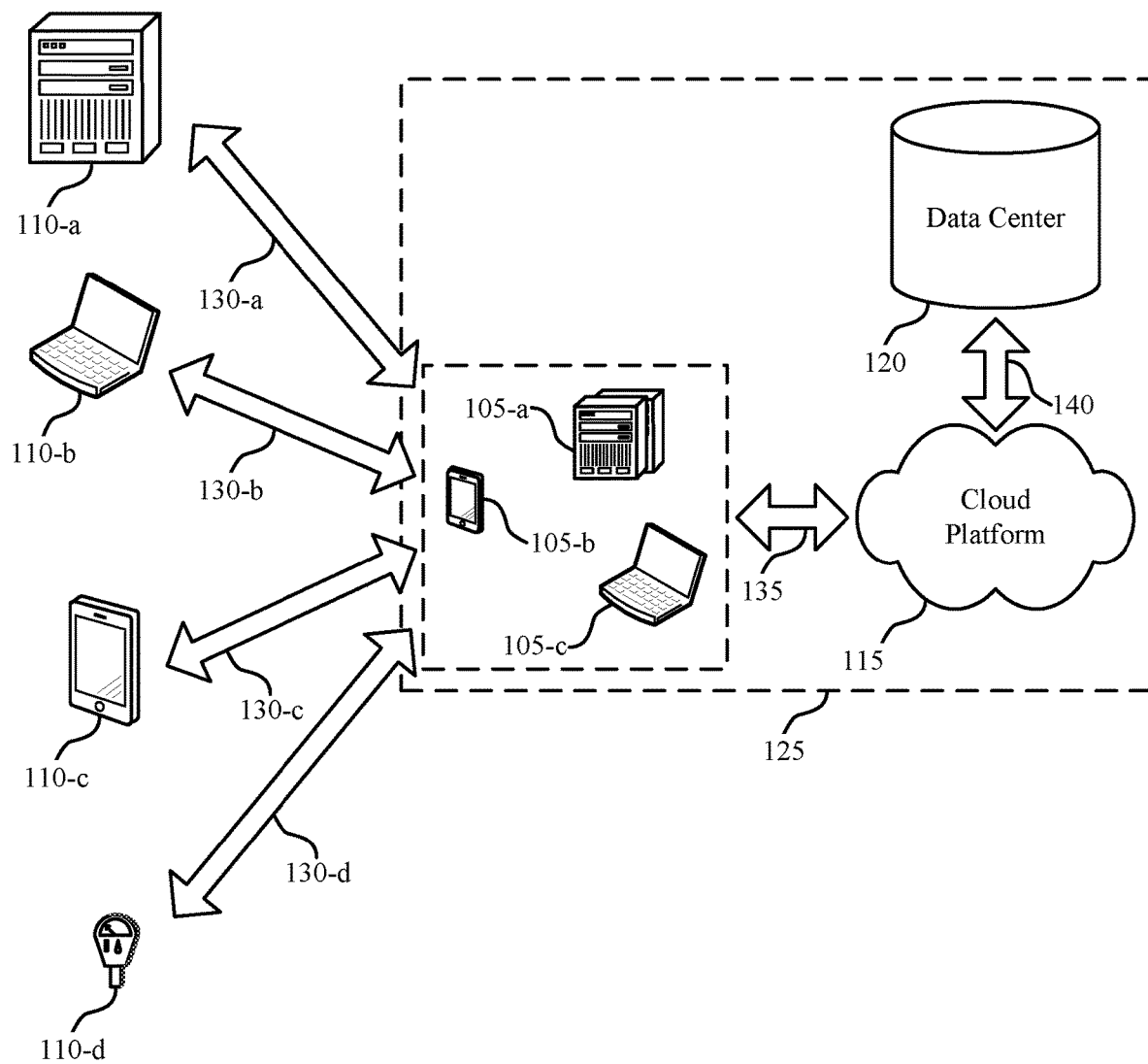
FIG. 1 illustrates an example of a system for data attribution at a database system that supports data attribution using frequent pattern analysis in accordance with aspects of the present disclosure.

FIG. 1 illustrates an example of a system 100 for cloud computing that supports data attribution using frequent pattern analysis in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, a cloud client 105 may support data attribution using FP analysis at a database system. For example, data center 120 may include a plurality of data objects received from a plurality of cloud clients 105. The data objects may each include a set of data attribute patterns that have been determined based on a FP analysis of the data set. In some examples, the data attribute patterns may be received by a cloud client 105 based on the data center 120 conducting a FP analysis on the data set. After receiving the data attribute patterns, the cloud client 105 may identify a resulting data attribute for analysis.

Upon identifying the resulting data attribute, the cloud client 105 may determine a set of input data attributes corresponding to the resulting data attribute for analysis. For example the set of input data attributes may be selected by a user of the cloud client 105. Based on the user input, the cloud client 105 may remove at least one input data attribute from the set of input data attributes. The resulting input data attributes may be referred to as a subset of input data attributes. The cloud client 105 may then calculate a probability change that corresponds to a difference between a probability that the set of input data attributes corresponds to the resulting data attribute and a probability that the subset of input data attributes corresponds to the resulting data attribute. Stated another way, the cloud client 105 may, after removing the at least one input data attribute from the set, determine the extent that the removed input data attribute is associated with the resulting data attribute. In some examples, the cloud client 105 may independently remove each input data attribute from the set of input data attributes individually or by removing various combinations of input data attributes from the set. Based on the removal and subsequent calculation, the cloud client 105 may assign an attribution value to the removed input data attribute. As indicated herein, the attribution value may indicate a probability that the at least one input data attribute corresponds to the resulting data attribute. As such, the subsystem 125 may effectively determine the extent to which each data attribute pattern relates to the identified resulting data attribute.

By calculating the aforementioned probability change and subsequently assigning an attribution value to each input data attribute, contributions of particular pieces of data within a data set may be determined. Stated another way, calculating a probability change associated with each input data attribute and assigning a respective attribution value may allow a user to distinguish between the contributions of particular pieces of data within a data set. For example, a user may conduct an FP analysis on a data set to determine what events (e.g., what data attributes) contributed to an individual purchasing a particular movie ticket. Ordinarily, the FP analysis may indicate that three events exist: a user shopping online, a user visiting a movie review website, and a user selecting a particular advertisement while visiting the movie review website. However, by calculating the aforementioned probability change and assigning an attribution value to each input data attribute (e.g., each event), the techniques described herein may determine that a user shopping online contributed 20%, a user visiting a movie review website contributed 50%, and a user selecting a particular advertisement while visiting the movie review website contributed 30% to the user purchasing the particular movie ticket.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
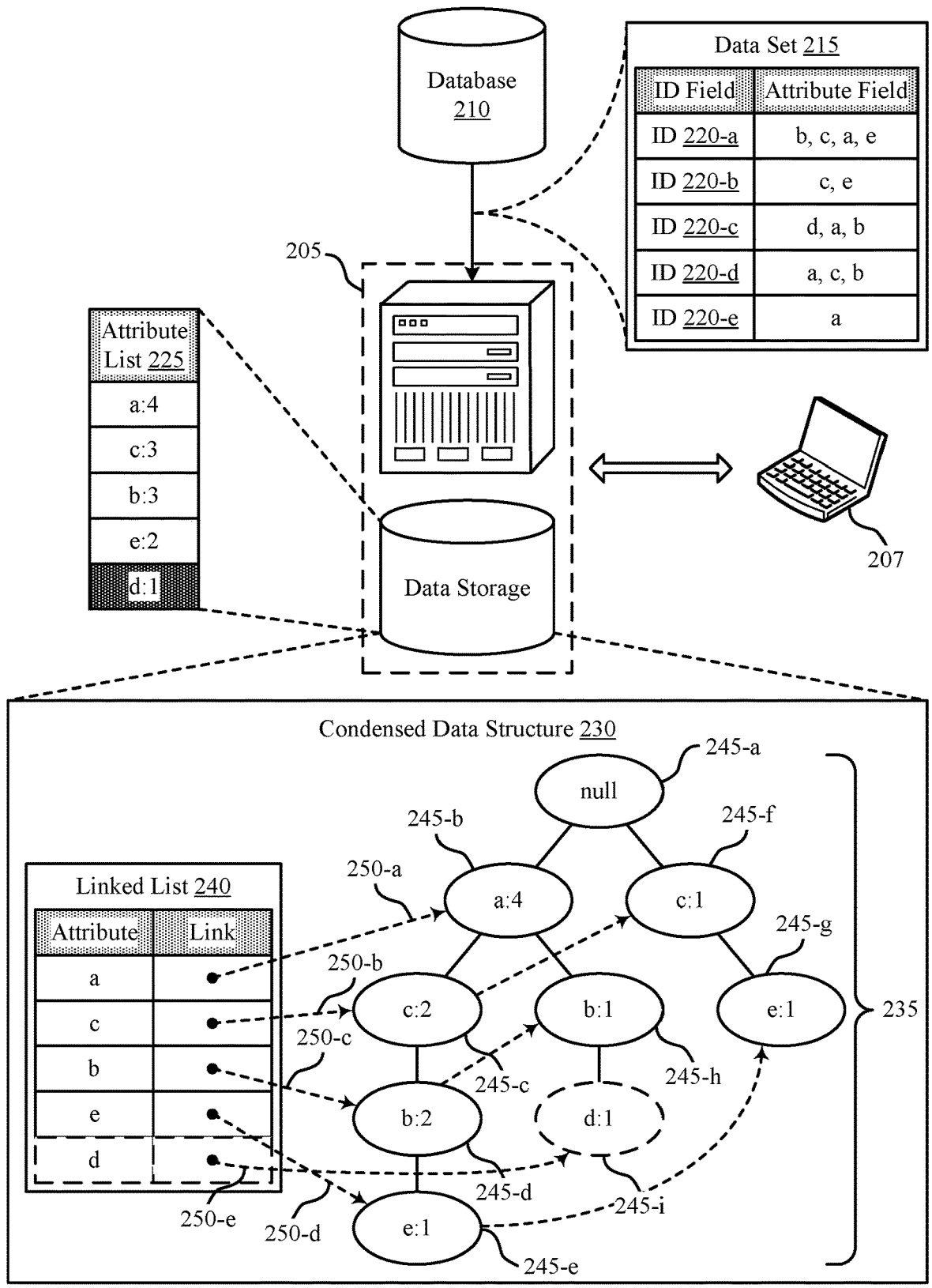
FIG. 2 illustrates an example of a database system implementing a frequent pattern (FP) analysis procedure in accordance with aspects of the present disclosure.

FIG. 2 illustrates an example of a database system 200 implementing an FP analysis procedure in accordance with aspects of the present disclosure. The database system 200 may be an example of a data center 120 as described with reference to FIG. 1, and may include a database 210, a user device 207, and a data processing machine 205. In some cases, the database 210 may be an example of a transactional database, a time-series database, a multi-tenant database, or some combination of these or other types of databases. The data processing machine 205 may be an example of a database server, an application server, a server cluster, a virtual machine, a container, or some combination of these or other hardware or software components supporting data processing for the database system 200. The data processing machine 205 may include a processing component and a local data storage component, where the local data storage component supports the memory resources of the data processing machine 205 and may be an example of a magnetic tape, magnetic disk, optical disc, flash memory, main memory (e.g., random access memory (RAM)), memory cache, cloud storage system, or combination thereof. The data processing machine 205 may perform an FP analysis on a data set 215 (e.g., based on a user input command, or automatically based on a configuration of the database system 200 or a supported FP-based application).

As described below, the database system 200 may implement an FP-growth model for pattern mining that utilizes a condensed data structure 230. The condensed data structure 230 may include an FP-tree 235 and a linked list 240 linked to the nodes 245 of the FP-tree 235 (e.g., via links 250). However, it is to be understood that the database system 200 may alternatively use other FP analysis techniques and data structures than those described. For example, the database system 200 may use a candidate set generation-and-test technique, a tree projection technique, or any combination of these or other FP analysis techniques. The differential support techniques described may be implemented with the FP-growth technique and the condensed data structure 230, or with any other FP analysis technique or data structure.

The data processing machine 205 may receive a data set 215 for processing. For example, the database 210 may transmit the data set 215 to the data processing machine 205 for FP analysis. The data set 215 may include multiple data objects, where each data object includes an identifier (ID) 220 and a set of data attributes. The data set 215 may include all data objects in the database 210, or may include data objects associated with a certain tenant (e.g., if the database 210 is a multi-tenant database), with a certain time period (e.g., if the attributes are associated with events or activities with corresponding timestamps), or with some other subset of data objects based on a user input value. For example, in some cases, a user operating a user device may select one or more parameters for the data set 215, and the user device may transmit the parameters to the database 210 (e.g., via a database server). The database 210 may transmit the data set 215 to the data processing machine 205 based on the received user input.

Each data object in the data set 215 may be identified based on an ID 220, and may be associated with one or more data attributes. These data attributes may be unique to that data object, or may be common across multiple data objects. In the exemplary case illustrated, the data set 215 may include five data objects. The first data object with ID 220-a may include data attributes {b, c, a, e}, the second data object with ID 220-b may include data attributes {c, e}, the third data object with ID 220-c may include data attributes {d, a, b}, the fourth data object with ID 220-d may include data attributes {a, c, b}, and the fifth data object with ID 220-e may include data attribute {a}. In one example, each data object may correspond to a different user or user device, and each data attribute may correspond to an activity or activity parameter performed by the user or user device. For example, attribute {a} may correspond to a user making a particular purchase online, while attribute {b} may correspond to a user visiting a particular website in a web browser of a user device. These data attributes may be binary values (e.g., Booleans) related to characteristics of a user.

The data processing machine 205 may receive the data set 215, and may construct a condensed data structure 230 based on the data set 215. The construction process may involve two passes through the data set 215, where the data processing machine 205 processes the data attributes for each data object in the data set 215 during each pass. In a first pass through the data set 215, the data processing machine 205 may generate an attribute list 225. The attribute list 225 may include the data attributes contained in the data set 215, along with their corresponding supports (i.e., occurrence frequencies within the data set 215). In some cases, during this first pass, the data processing machine 205 may filter out one or more attributes based on the supports for the attributes and a minimum support threshold, $\xi$. In these cases, the resulting data attributes included in the attribute list 225 may be referred to as frequent items or frequent attributes. The data processing machine 205 may order the data attributes in the attribute list 225 in descending order of support. For example, as illustrated, data processing machine 205 may identify that attribute {a} occurs four times in the data set 215, attributes {c} and {b} occur three times, attribute {e} occurs two times, and attribute {d} occurs one time. If the minimum support threshold, is equal to two, the data processing machine 205 may remove {d} from or otherwise not include {d} in the attribute list 225, as the support for attribute {d} is less than the minimum support threshold. In some cases, a user may specify the minimum support threshold, using input features of a user interface. The data processing machine 205 may store this attribute list 225 in memory (e.g., temporary memory or persistent memory).

In a second pass through the data set 215, the data processing machine 205 may generate the condensed data structure 230 for efficient FP mining, where the condensed data structure 230 includes an FP-tree 235 and a linked list 240. The data processing machine 205 may generate a root node 245-a for the FP-tree 235, and may label the root node 245-a with a "null" value. Then, for each data object in the data set 215, the data processing machine 205 may order the attribute fields according to the order of the attribute list 225 (e.g., in descending order of support), and may add or update a branch of the FP-tree 235. For example, the data processing machine 205 may order the data attributes for the first data object with ID 220-a in order of descending support {a, c, b, e}. As no child nodes 245 exist in the FP-tree 235, the data processing machine 205 may create new child nodes 245 representing this ordered set of data attributes. The node for the first attribute in the ordered set is created as a child node 245-b of the root node 245-a, the node for the second attribute is created as a further child node 245-c off of this child node 245-b, and so on. For example, the data processing machine may create node 245-b for attribute {a}, node 245-c for attribute {c}, node 245-d for attribute {b}, and node 245-e for attribute {e}. When creating a new node 245 in the FP-tree 235, the data processing machine 205 may additionally set the count for the node 245 to one (e.g., indicating the one instance of the data attribute represented by the node 245).

The data processing machine 205 may then process the second data object with ID 220-b. The data processing machine 205 may order the data attributes as {c, e}, and may check the FP-tree 235 for any nodes 245 stemming from the root node 245-a that correspond to this pattern. As the first data attribute of this ordered set is {c}, and the root node 245-a does not have a child node 245 for {c}, the data processing machine 205 may create a new child node 245-f from the root node 245-a for attribute {c} and with a count of one. Further, the data processing machine 205 may create a child node 245-g off of this {c} node 245-f, where node 245-g represents attribute {e} and is set with a count of one.

As a next step in the process, the data processing machine 205 may order the attributes for the data object with ID 220-c as {a, b, d}, and may add this ordered set to the FP-tree 235. In some cases, if data attribute {d} does not have a significantly large enough support value (e.g., as compared to the minimum support threshold, the data processing machine 205 may ignore the {d} data attribute (and any other data attributes that are not classified as frequent attributes) in the list of attributes for the data object. In either case, the data processing machine 205 may check the FP-tree 235 for any nodes 245 stemming from the root node 245-a that correspond to this ordered set. Because child node 245-b for attribute {a} stems from the root node 245-a, and the first attribute in the ordered set for the data object with ID 220-c is {a}, the data processing machine 205 may determine to increment the count for node 245-b rather than create a new node 245. For example, the data processing machine 205 may change node 245-b to indicate attribute {a} with a count of two. As the only child node 245 off of node 245-b is child node 245-c for attribute {c}, and the next attribute in the ordered set is {b}, the data processing machine 205 may generate a new child node 245-h off of node 245-b that corresponds to attribute {b} and may assign the node 245-h a count of one. If attribute {d} is included in the attribute list 225, the data processing machine 205 may additionally create child node 245-I for {d}.

This process may continue for each data object in the data set 215. For example, in the case illustrated, the data object with ID 220-d may increment the counts for nodes 245-b, 245-c, and 245-d, and the data object with ID 220-e may increment the count for node 245-b. Once the attributes—or the frequent attributes, when implementing a minimum support threshold—from each data object in the data set 215 are represented in the FP-tree 235, the FP-tree 235 may be complete in memory of the data processing machine 205 (e.g., stored in local memory for efficient processing and FP mining, or stored externally for improved memory capacity). By generating the ordered attribute list 225 in the first pass through the data set 215, the data processing machine 205 may minimize the number of branches needed to represent the data, as the most frequent data attributes are included closest to the root node 245-a. This may support efficient storage of the FP-tree 235 in memory. Additionally, generating the attribute list 225 allows the data processing machine 205 to identify infrequent attributes and remove these infrequent attributes when creating the FP-tree 235 based on the data set 215.

In addition to the FP-tree 235, the condensed data structure 230 may include a linked list 240. The linked list 240 may include all of the attributes from the attribute list 225 (e.g., all of the attributes in the data set 215, or all of the frequent attributes in the data set 215), and each attribute may correspond to a link 250. Within the table, these links 250 may be examples of head of node-links, where the node links point to one or more nodes 245 of the FP-tree 235 in sequence or in parallel. For example, the entry in the linked list 240 for attribute {a} may be linked to each node 245 in the FP-tree 235 for attribute {a} via link 250-a (e.g., in this case, attribute {a} is linked to node 245-b). If there are multiple nodes 245 in the FP-tree 235 for a specific attribute, the nodes 245 may be linked in sequence. For example, attribute {c} of the linked list 240 may be linked to nodes 245-c and 245-f in sequence via link 250-b. Similarly, link 250-c may link attribute {b} of the linked list 240 to nodes 245-d and 245-h, link 250-d may link attribute {e} to nodes 245-e and 245-g, and—if frequent enough to be included in the attribute list 225—link 250-e may link attribute {d} to node 245-i.

In some cases, the data processing machine 205 may construct the linked list 240 following completion of the FP-tree 235. In other cases, the data processing machine 205 may construct the linked list 240 and the FP-tree 235 simultaneously, or may update the linked list 240 after adding each data object representation from the data set 215 to the FP-tree 235. The data processing machine 205 may also store the linked list 240 in memory along with the FP-tree 235. In some cases, the linked list 240 may be referred to as a header table (e.g., as the "head" of the node-links are located in this table). Together, these two structures form the condensed data structure 230 for efficient FP mining at the data processing machine 205. The condensed data structure 230 may contain all information relevant to FP mining from the data set 215 (e.g., for a minimum support threshold, $\xi$). In this way, transforming the data set 215 into the FP-tree 235 and corresponding linked list 240 may support complete and compact FP mining.

The data processing machine 205 may perform a pattern growth method, FP-growth, to efficiently mine FPs from the information compressed in the condensed data structure 230. In some cases, the data processing machine 205 may determine the complete set of FPs for the data set 215. In other cases, the data processing machine 205 may receive a data attribute of interest (e.g., based on a user input in a user interface), and may determine all patterns for that data attribute. In yet other cases, the data processing machine 205 may determine a single "most interesting" pattern for a data attribute or a data set 215. The "most interesting" pattern may correspond to the FP with the highest occurrence rate, the longest list of data attributes, or some combination of a high occurrence rate and long list of data attributes. For example, the "most interesting" pattern may correspond to the FP with a number of data attributes greater than an attribute threshold with the highest occurrence rate, or the "most interesting" pattern may be determined based on a formula or table indicating a tradeoff between occurrence rate and length of the attribute list. In some examples, the FP analysis may be performed on an entire set of potential FPs in order to reduce the potential size of the resulting input data attribute patterns. In some examples, as described herein, the set of data attribute patterns may be based on a number of occurrences of each data attribute pattern of the set of data attribute patterns.

To determine all of the patterns for a data attribute, the data processing machine 205 may start from the head of a link 250 and follow the node link 250 to each of the nodes 245 for that attribute. The FPs may be defined based on a minimum support threshold, which may be the same minimum support threshold as used to construct the condensed data structure 230. For example, if ξ=2, a pattern is only considered "frequent" if it appears two or more times in the data set 215. To identify the complete set of FPs for the data set 215, the data processing machine 205 may perform the mining procedure on the attributes in the linked list 240 in ascending order. As attribute {d} does not pass the minimum support threshold of ξ=2, the data processing machine 205 may initiate the FP-growth method with data attribute {e}.

To determine the FPs for data attribute {e}, the data processing machine 205 may follow link 250-d for attribute {e}, and may identify node 245-e and node 245-g both corresponding to attribute {e}. The data processing machine 205 may identify that data attribute {e} occurs two times in the FP-tree 235 (e.g., based on summing the count values for the identified nodes 245-e and 245-g), and thus has at least the simplest FP of (e:2) (i.e., a pattern including attribute {e} occurs twice in the data set 215). The data processing machine 205 may determine the paths to the identified nodes 245, {a, c, b, e} and {c, e}. Each of these paths occurs once in the FP-tree 235. For example, even though node 245-b for attribute {a} has a count of four, this attribute {a} appears together with attribute {e} only once (e.g., as indicated by the count of one for node 245-e). These identified patterns may indicate the path prefixes for attribute {e}, namely {a:1, c:1, b:1} and {c:1}. Together, these path prefixes may be referred to as the sub-pattern base or the conditional pattern base for data attribute {e}. Using the determined conditional pattern base, the data processing machine 205 may construct a conditional FP-tree for attribute {e}. That is, the data processing machine 205 may construct an FP-tree using similar techniques as those described above, where the FP-tree includes only the attribute combinations that include attribute {e}. Based on the minimum support threshold, and the identified path prefixes {a:1, c:1, b:1} and {c:1}, only data attribute {c} may pass the support check. Accordingly, the conditional FP-tree for data attribute {e} may contain a single branch, where the root node 245 has a single child node 245 for attribute {c} with a count of two (e.g., as both of the path prefixes include attribute {c}). Based on this conditional tree, the data processing machine 205 may derive the FP (ce:2). That is, the attributes {c} and {e} occur together twice in the data set 215, while attribute {e} does not occur at least two times in data set 215 with any other data attribute. For conditional FP-trees with greater than one child node 245, the data processing machine 205 may implement a recursive mining process to determine all eligible FPs that contain the attribute being examined. The data processing machine 205 may return the FPs (e:2) and (ce:2) for the data attribute {e}. In some cases, the data processing machine 205 may not count patterns that simply contain the data attribute being examined as FPs, and, in these cases, may just return (ce:2).

This FP-growth procedure may continue with attribute {b}, then attribute {c}, and conclude with attribute {a}. For each data attribute, the data processing machine 205 may construct a conditional FP-tree. Additionally, because the FP-growth procedure is performed in an ascending order through the linked list 240, the data processing machine 205 may ignore child nodes 245 of the linked nodes 245 when determining the FPs. For example, for attribute {b}, the link 250-c may indicate nodes 245-d and 245-h. When identifying the paths for {b}, the data processing machine 205 may not traverse the FP-tree 235 past the linked nodes 245-d or 245-h, as any patterns for the nodes 245 below this on the tree were already determined in a previous step. For example, the data processing machine 205 may ignore node 245-e when determining the patterns for node 245-d, as the patterns including node 245-e were previously derived. Based on the FP-growth procedure and these conditional FP-trees, the data processing machine 205 may identify additional FPs for the rest of the data attributes in the linked list 240. For example, using a recursive mining process, the data processing machine 205 may determine the complete set of FPs: (e:2), (ce:2), (b:3), (cb:2), (ab:3), (acb:2), (c:3), (ac:2), and (a:4).

The data processing machine 205 may transmit the patterns resulting from the FP analysis to the database 210 for storage, or to a user device for further processing or to display in a user interface. In some cases, the data processing machine 205 may determine a "most interesting" FP (e.g., (acb:2) based on the number of data attributes included in the pattern), and may transmit an indication of the "most interesting" FP to the user device. In other cases, the user device may transmit an indication of an attribute for examination (e.g., data attribute {c}), and the data processing machine 205 may return one or more of the FPs including data attribute {c} in response.

By transforming the data set 215 into the condensed data structure 230, the data processing machine 205 may avoid the need for generating and testing a large number of candidate patterns, which can be very costly in terms of processing and memory resources, as well as in terms of time. For very large database systems 200, databases 210, or data sets 215, the FP-tree 235 may be much smaller than the size of the data set 215, and the conditional FP-trees may be even smaller. For example, transforming a large data set 215 into an FP-tree 235 may shrink the data by a factor of approximately one hundred, and transforming the FP-tree 235 into a conditional FP-tree may again shrink the data by a factor of approximately one hundred, resulting in very condensed data structures 230 for FP mining.

In some cases, the FP analysis procedure may support data attribution using FP analysis in accordance with aspects of the present disclosure. For example, database 210 may include a data set 215 received from a plurality of user devices (e.g., from user device 207). The data set 215 may be associated with an attribute list 225 that may have been determined based on a FP analysis of the data set. When performing the FP analysis on the data set, the database system may remove particular data attribute patterns to limit redundancy and improve management of resources in the system. By performing this process on the entire set of potential FPs, the resulting set of FPs or potential attribute combinations may be greatly reduced in size, without significantly affecting the information or insight provided by the FPs. That is, as a result of the FP analysis, only those attribute combinations having meaningful density may remain. In some cases, the resulting set of data attribute patterns after the FP analysis may be based on a number of occurrences of each data attribute pattern of the set of data attribute patterns. By identifying attribute combinations having a meaningful density (e.g., by performing a FP analysis on a data set), high dimensional attribute combinations may be preserved. Stated another way, method described herein may intelligently reduce the number of potential attribute combinations using FP analysis, and not merely reduce an overall dimension of total attribute combinations.

After receiving the attribute list 225, the user device 207 may identify a resulting data attribute for analysis (e.g., for further analysis), and may determine a set of input data attributes corresponding to the resulting data attribute for analysis. In some examples, the database system 200 may subsequently remove at least one input data attribute from the set of input data attributes, resulting in a subset of data input attributes. The database system 200 may then calculate a probability change that corresponds to a difference between a probability that the set of input data attributes corresponds to the resulting data attribute and a probability that the subset of input data attributes corresponds to the resulting data attribute. As indicated herein, removing the at least one input data attribute may allow for a determination of the extent that the removed input data attribute is associated with the resulting data attribute. Based on the removal and subsequent calculation, the database system 200 may assign an attribution value to the removed input data attribute. As such, the database system may effectively determine the extent to which each data attribute pattern relates to the identified resulting data attribute.

Figure 3:
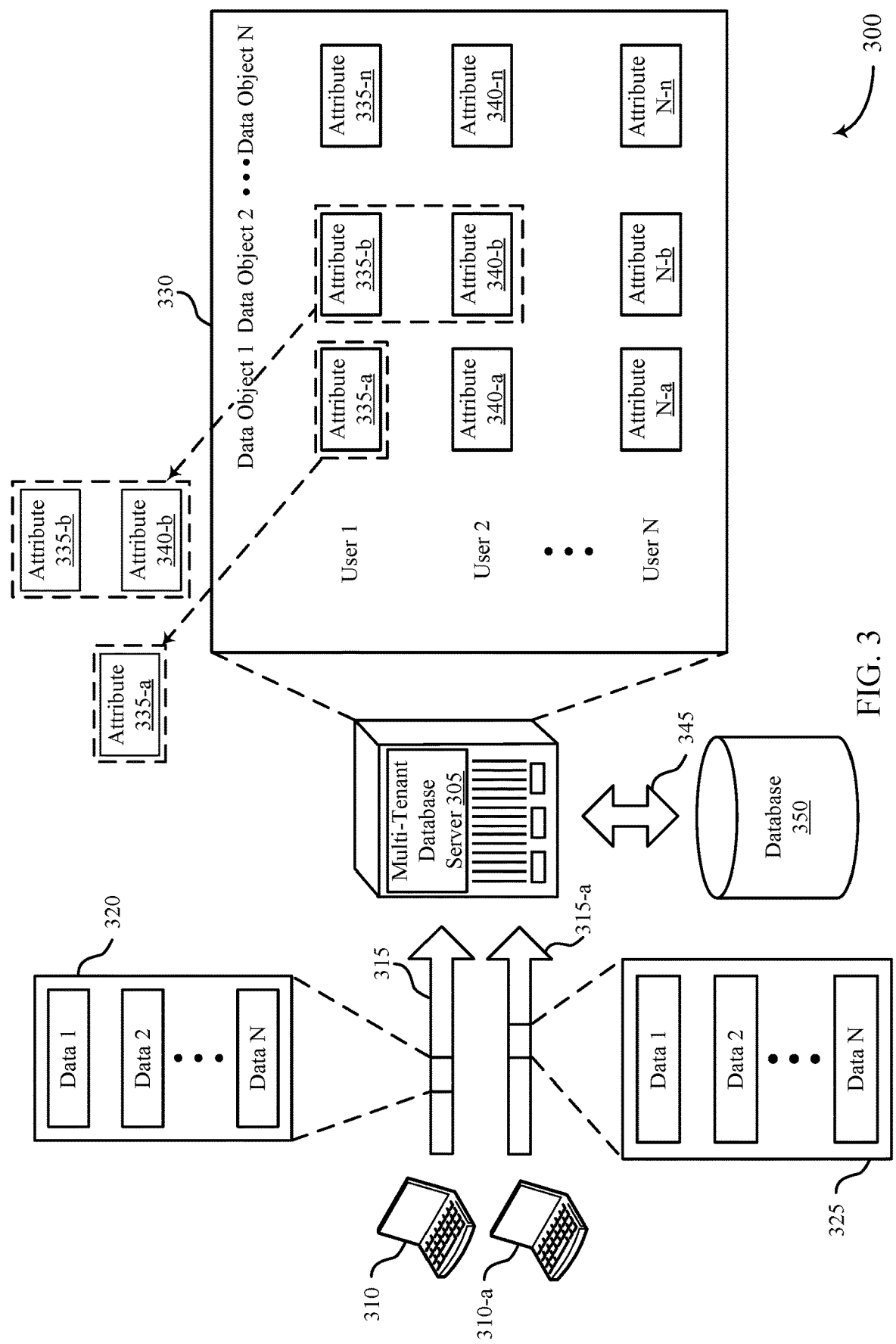
FIG. 3 illustrates an example of a data processing workflow platform that supports data attribution using frequent pattern analysis in accordance with aspects of the present disclosure.

FIG. 3 illustrates an example of a data processing workflow platform 300 that supports data attribution using frequent pattern analysis in accordance with aspects of the present disclosure. Data processing workflow platform 300 may include a multi-tenant database server 305, users 310 and 310-a, where each user may correspond to a user device associated with the respective user. Each user may transmit a variety of data to the multi-tenant database server 305 over a respective interaction (e.g., over interaction 315 and interaction 315-a). For example, each user may transmit data that may include, for example, browser data, application data, usage data, and the like. In some cases, each user 310 may be an example of a cloud client 105 as described with reference to FIG. 1 and/or a user device 207 as described with reference to FIG. 2. Multi-tenant database server 305 may support multiple users, and each user may support multiple tenants.

In some cases, each user 310 may transmit a variety of data to the multi-tenant database server 305. As described above, the data may include browser data, application data, usage data, and the like. The received data may be stored within table 330, and may be referred to as a data set. Within the data set, various data objects may exist. For example, browser data, application data, and usage data (e.g., of a user device) may each be or may each be referred to as an individual data object. Each individual data object may include a specific attribute or set of attributes associated with the object. An attribute of the data object may further-define or further-indicate a characteristic of the particular data object. A particular attribute (e.g., attribute 335-a) may be associated with a first user (e.g., user 310) and a first data object associated with the first user. For example, a first data object associated with a first user may be or may include information regarding a transaction where the user purchased shoes from an online retailer. In some examples, attribute 335-a may indicate that the shoes the user purchased were red. Table 330 may store a plurality of data objects and attributes associated with any one data object (e.g., Data Object N, Attribute 335-n). Additionally or alternatively, table 330 may store data objects and/or attributes associated with a plurality of users (e.g., User N).

In some examples, FP analysis may be performed on the data stored at table 330 (e.g., by the multi-tenant database server 305). The type of FP analysis performed may be based on a desired result of the analysis. For example, a user may wish to understand various interactions and patterns between data attributes associated with multiple users, or the user may wish to determine top characteristics associated with one or more attributes of a user. As described herein, the data stored in table 330 may be associated with real-life events of multiple users (e.g., users 310, 310-a). To understand the interactions and patterns between various data attributes, a user may first identify a resulting data attribute for analysis. Stated another way, a user may define an intended result based on the FP analysis. For example, a user may wish to know what events (e.g., what data attributes) contributed to a user purchasing a particular movie ticket.

To conduct such an analysis, the multi-tenant database server 305 may look at a variety of attributes (e.g., attribute 335-a, 340-b) that contribute to the intended analysis. Using the movie ticket example described above, the multi-tenant database server 305 may thus identify the attributes associated with a user that signify the particular user purchased the movie ticket. Upon making this identification, the multi-tenant database server 305 may analyze a set of input data attributes (e.g., all other attributes associated with each user that purchased the ticket) and conduct an FP analysis on the set of attributes.

In conducting the FP analysis on the set of attributes, the multi-tenant database server 305 may determine, based on comparing various data attributes, the probability that any one attribute contributed to the user purchasing the particular ticket, and the probability that any one attribute did not contribute to the user purchasing the particular ticket. Based on this probabilistic analysis, the multi-tenant database server 305 may then determine a set of attributes that contributed to the resulting data attribute (e.g., contributed to the user purchasing the ticket). The set of attributes may be displayed to the user.

As described herein, the multi-tenant database server may assign an attribution value to one or more input data attributes. In some examples, the multi-tenant database sever 305 may receive a set of data attribute patterns for a data set based in part on conducting an FP analysis. After conducting the FP analysis on the data set, as described herein, the multi-tenant database server 305 may identify a set of data attribute patterns. In some examples, the FP analysis may be conducted on an entire data set (e.g., on all potential interactions of the attributes of the data) and the multi-tenant database server 305 may identify data attribute patterns relevant to the analysis at hand. For example, the FP analysis may determine the frequency and/or recentness of each data attribute in the data set. The multi-tenant database server 305-a may subsequently identify a resulting data attribute for analysis. For example, a user may wish to know what events (e.g., what data attributes) contributed to a user purchasing a particular movie ticket.

Based on the identified resulting data attribute (e.g., purchasing a particular movie ticket), the multi-tenant database server 305 may determine a set of input data attributes corresponding to the resulting data attribute. The set of input data attributes may be determined from (e.g., based on) the set of data attribute patterns received based on the FP analysis conducted on the data set. In some examples, the set of input data attributes may be based on a probability that each corresponding input data attribute is associated with the resulting data attribute. For example, the multi-tenant database server 305 may identify the following data attribute patterns: a user shopping online, a user visiting a movie review website, a user selecting a particular advertisement while visiting the movie review website, a user watching particular movie trailers, and a user reading a movie review.

In order to assign an attribution value to one or more input data attributes, the multi-tenant database server 305 may remove at least one input data attribute from the set of input data attributes. The removal may result in a subset of input data attributes (e.g., the set of input data attributes minus the removed input data attribute). For example, as shown in FIG. 3, attribute 335-*a* may be an example of an input data attribute and, for purposes of assigning an attribution value, may be removed from table 330. A probability change that corresponds to a difference between a probability that the set of input data attributes corresponds to the resulting data attribute may then be calculated. Stated another way, the multi-tenant database server 305 may determine that each input data attribute of the set of input data attributes corresponds to the resulting data attribute. For example, a user visiting a movie review website may correspond to a user purchasing a particular movie ticket. By removing at least one input data attribute (e.g., a user visiting a movie review website) and performing the calculation described herein, the multi-tenant database server 305 may determine the importance to which a user visiting a movie review website played in a user purchasing a particular movie ticket.

In some examples, the calculation performed by the multi-tenant database server 305 may include calculating a probability that the subset of input data attributes corresponds to the resulting data attribute. Thus by calculating both the probability change corresponding to a difference between a probability that the set of input data attributes corresponds to the resulting data attribute and the probability that the subset of input data attributes corresponds to the resulting data attribute, an attribution value may be accurately assigned to the removed input data attribute. For example, a probability may exist that a user shopping online, a user visiting a movie review website, a user selecting a particular advertisement while visiting the movie review website, a user watching particular movie trailers, and a user reading a movie review each contribute to a user purchasing a particular movie ticket. For purposes of illustration, the probability may equal one hundred percent (e.g., if a user performs each of the five aforementioned actions, he or she will purchase the particular movie ticket). By removing one input data attribute (e.g., a user visiting a movie review website) the probability that the subset corresponds to the resulting data attribute may be reduced to eighty percent (e.g., if a user performs all but one of the aforementioned actions, there is an eighty percent chance that he or she will purchase the particular movie ticket). Accordingly an attribution value may be assigned that indicates there is a twenty percent chance that a user will purchase the particular movie ticket if he or she visits a movie review website.

In some examples, after removing the at least one input data attribute, the input data attribute may be added back to the set of input data attributes. Additional input data attributes may be removed from the set, and subsequent calculations may be performed as described herein. Thus, in some examples, each input data attribute may be—at one point— removed from the set of input data attributes and assigned an attribution value. In other examples, various combinations of input data attributes may be identified. For example, the combinations may be based on a common characteristic (e.g., related to browsing the Internet). As described herein, each combination of input data characteristics may be removed from the set of input data attributes, and subsequently be assigned attribution values. In some examples, one or more data input attributes may be selected for removal based on greatest positive probability change value or a greatest negative probability change value (e.g., the most relevant or least-relevant input data attributes).

In some examples, FP analysis may be performed on a data set in order to determine one or more patterns (e.g., attribute combinations) that have meaningful density. Stated another way, in some applications, a data set may include an intractable amount of data and, in turn, an intractable quantity of data attribute patterns or combinations. This large set of patterns may incur a significant memory or processing overhead at the database system, reducing the efficiency of the FP mining and analysis process. However, many of these patterns may be very similar in both data attributes and support (i.e., frequency within the data set).

To more efficiently manage the memory and processing resources of the database system, the system may determine a semi-static or dynamic threshold occurrence difference between related patterns. For example, the database system may remove particular data attribute patterns to limit redundancy and improve management of resources in the system. By performing this process on the entire set of potential FPs, the resulting set of FPs may be greatly reduced in size, without significantly affecting the information or insight provided by the FPs. Thus the set of data attribute patterns may be based on a number of occurrences of each data attribute pattern of the set of data attribute patterns. By performing FP analysis on the data set, the resulting set of data attribute patterns may contain a manageable quantity of data combinations for subsequent calculations (e.g., for attribution analysis using the Shapely value or formula).

In some examples, as described herein, calculating the probability change corresponding to the difference between the probability that the set of input data attributes corresponds to the resulting data attribute and the probability that the subset of input data attributes corresponds to the resulting data attribute may be conducted using the Shapley value (e.g., the Shapley formula). The Shapley value may assign a unique distribution to each value (e.g., among the input data attributes) that corresponds to a total surplus generated by the coalition of all of the values. Stated another way, the Shapley value may attribute an overall contribution to each value based on its relationship to the group of values. The attribution may be made, for example, after an FP analysis is performed on a data set. In some examples, the Shapley value may be represented by the formula:

$$\phi_i(v) = \frac{1}{|N|!} \sum_R [v(P_i^R \cup \{i\}) - v(P_i^R)]$$

In the formula, $|N|!$ may represent a total number of input data attributes, R may represent a total number of orders of the input data attributes, and $P_i^R$ may represent a total number of input data attributes that precede a specific input data attribute (i) in the total number of orders of the input data attributes. In some cases, as discussed above, the total number of input data attributes (or attribute combinations) may be reduced to a subset of attributes by first performing an FP analysis. Thus the Shapley value may remove (e.g., individually or in groups) input data attributes from the group of input data attributes to determine (e.g., calculate) the effect that the removed input data attribute has on the group. Because the set of input data attributes may be a result of an FP analysis, the Shapley value may remove input data attributes from a group of input data attributes having meaningful density (e.g., from a manageable subset of data). The resulting calculation may correspond to an attribution value that may be assigned to the particular input data attribute.

In some examples, a total number of input data attributes (e.g., |N|!) may be greater than one, thus multiple attribution values may be assigned. Because each attribution value is associated with a probability change corresponding to a difference between a probability that the set of input data attributes corresponds to the resulting data attribute and a probability that the second subset of input data attributes corresponds to the resulting data attribute, the sum of each attribution value may be equivalent to a total probability. Stated another way, a sum of each attribution value may be equal to a total probability that each attributed data attribute correspond to the resulting data attribute. For example, an attribution value may be assigned to three input data attributes: 0.3 to the first input data attribute, 0.4 to the second input data attribute, and 0.2 to the third input data attribute. Thus the sum of the three attribution values (e.g., 0.9) may be equivalent to a total probability (e.g., 90%) that at least one of the three input data attributes correspond to the resulting data attribute.

In the aforementioned examples, a user may input (e.g., to a user device 310, 310-a) his or her preferences for a resulting data attribute for analysis and/or whether to select the set of input data attributes with the greatest positive probability change value or the greatest negative probability change value. These input data attributes may be identified from a plurality of sets of data attributes (e.g., based on an FP analysis). The user may input his or her preferences, for example, through a user interface of the user device 310, 310-a.

In some examples, multi-tenant database server 305 may communicate with a database 350 (e.g., over a network connection 345) to store, retrieve, process, or perform additional actions on data records corresponding to or owned by users 310, 310-a. In other cases, users 310, 310-a may define one or more additional data sets and/or data objects for use in an FP analysis. Multi-tenant database server 305 may receive the updated data and may conduct an updated analysis (e.g., an FP analysis) and may update the results displayed to the user. For example, the multi-tenant database server 305 may update the displayed results in real-time.

Figure 4:
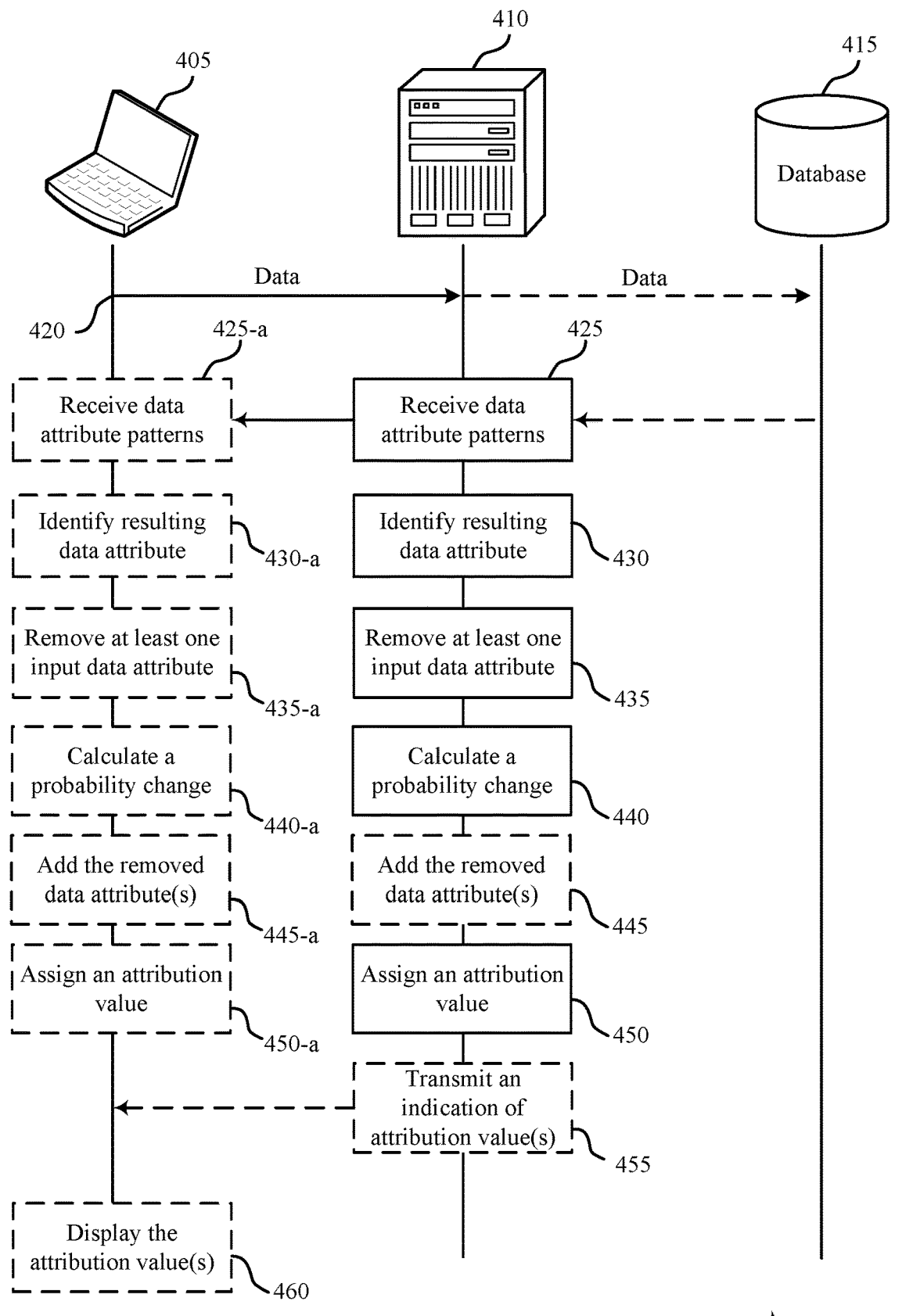
FIG. 4 illustrates an example of a process flow that supports data attribution using frequent pattern analysis in accordance with aspects of the present disclosure.

FIG. 4 illustrates an example of a process flow 400 that supports data attribution using frequent pattern analysis in accordance with aspects of the present disclosure. The process flow 400 may include a computing device 405, which may be an example of a user 310, 310-a as described with reference to FIG. 3; a multi-tenant database server 410, which may be an example of the multi-tenant database server 305 as described with reference to FIG. 3; and a database 415, which may be an example of database 350 as described with reference to FIG. 3.

Process flow 400 may be an example of data attribution using frequent pattern analysis as described with reference to FIG. 3. In some examples, the computing device 405 may transmit data 420 to multi-tenant database server 410. As described herein, the data may be or may include for example, browser data, application data, usage data, and the like. In other examples, the computing device may transmit data 420 to database 415.

In some examples, the multi-tenant database server 410 may receive a set of data attribute patterns 425 (e.g., from database 415). The set of data attribute patterns may be for a data set comprising a plurality of data objects. In some examples, the set of data attribute patterns may be determined based at least in part on a FP analysis of the data set. In other examples, the computing device 405 may receive a set of data attribute patterns 425-a (e.g., from multi-tenant database server 410). As described above, the set of data attribute patterns may be for a data set comprising a plurality of data objects and may be determined based at least in part on a FP analysis of the data set.

In some examples, after receiving the set of data attribute patterns (e.g., 425, 425-a), the multi-tenant database server 410 may identify a resulting data attribute for analysis 430. In other examples, the computing device 405 may identify a resulting data attribute for analysis 430-a (e.g., if the computing device 405 received the data attribute patterns 425-a).

In some examples, after identifying a resulting data attribute for analysis, the multi-tenant database server 410 may remove at least one input data attribute from the set of input data attributes 435. As described herein, a single input data attribute may be removed from the set, or a combination of input data attributes may be removed. The resulting data input data attributes may be or may be referred to as a subset of input data attributes. In other examples, the computing device 405 may remove at least one input data attribute from the set of input data attributes 435-a. As described herein, a single input data attribute may be removed from the set, or a combination of input data attributes may be removed.

In some examples, after removing at least one input data attribute from the set of input data attributes (e.g., 435, 435-a), the multi-tenant database server 410 may calculate a probability change 440. The probability change may correspond to a difference between a probability that the set of input data attributes corresponds to the resulting data attribute and a probability that the subset of input data attributes corresponds to the resulting data attribute. In other examples, the computing device 405 may calculate the probability change 440-a. As described herein, the probability change may correspond to a difference between a probability that the set of input data attributes corresponds to the resulting data attribute and a probability that the subset of input data attributes corresponds to the resulting data attribute.

In some examples, after calculating the probability change (e.g., 440, 440-a), the multi-tenant database server 410 may assign an attribution value 450. The attribution value may be assigned to the at least one input data attribute based at least in part on calculating the probability change. In some examples, the attribution value may indicate a probability that the at least one input data attribute corresponds to the resulting data attribute. In other examples, the computing device 405 may assign an attribution value 450-a. As described herein, the attribution value may be assigned to the at least one input data attribute based at least in part on calculating the probability change and may indicate a probability that the at least one input data attribute corresponds to the resulting data attribute.

Optionally, in some examples, the multi-tenant database server 410 may add the removed data attributes to the set of input data attributes 445. The removed data attributes may be added, for example, after the probability change is calculated (e.g. 440, 440-a). In other examples, the computing device 405 may add the removed data attributes to the set of input data attributes 445-a. As described herein, the removed data attributes may be added after the probability change is calculated (e.g. 440, 440-a). Optionally, in other examples, the multi-tenant database server 410 may transmit an indication of the assigned attribution value(s) 455. The indication of the assigned attribution values may be transmitted, for example, to the computing device 405, which may subsequently display the attribution value(s) 460. Whether the multi-tenant database server 410 transmits the indication of the assigned attribution value(s) is based on whether the computing device 405 or the multi-tenant database server 410 assigns the attribution value to the at least one input data attribute.

Figure 5:
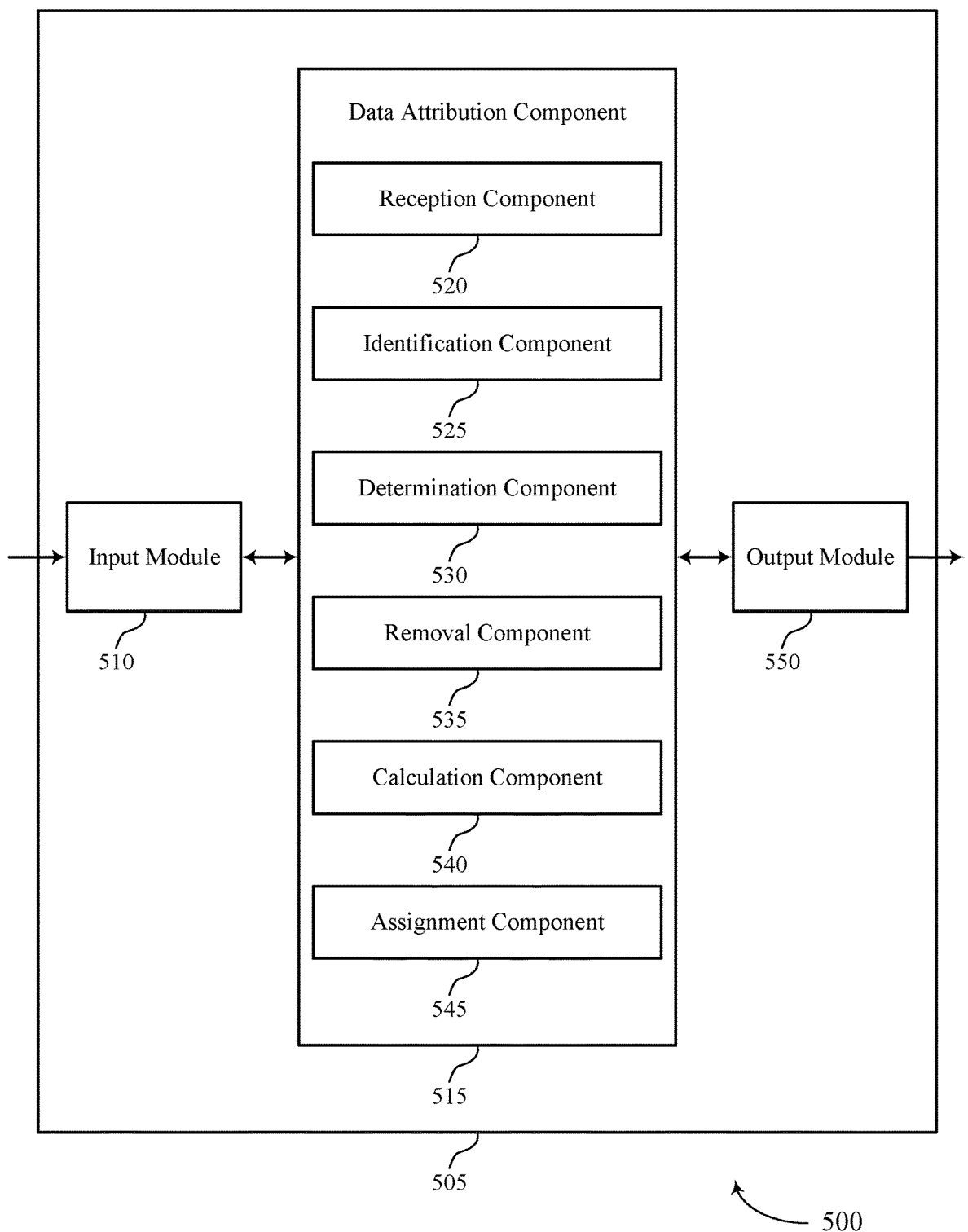
FIG. 5 shows a block diagram of an apparatus that supports data attribution using frequent pattern analysis in accordance with aspects of the present disclosure.

FIG. 5 shows a block diagram 500 of an apparatus 505 that supports data attribution using frequent pattern analysis in accordance with aspects of the present disclosure. The apparatus 505 may include an input module 510, a data attribution component 515, and an output module 550. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the data attribution component 515 to support data attribution using frequent pattern analysis. In some cases, the input module 510 may be a component of an input/output (I/O) controller 715 as described with reference to FIG. 7.

The data attribution component 515 may include a reception component 520, an identification component 525, a determination component 530, a removal component 535, a calculation component 540, and an assignment component 545. The data attribution component 515 may be an example of aspects of the data attribution component 605 or 710 described with reference to FIGS. 6 and 7.

The data attribution component 515 and/or at least some of its various sub-components may be implemented in hardware, software executed by a processor, firmware, or any combination thereof. If implemented in software executed by a processor, the functions of the data attribution component 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data attribution component 515 and/or at least some of its various sub-components may be physically located at various positions, including being distributed such that portions of functions are implemented at different physical locations by one or more physical devices. In some examples, the data attribution component 515 and/or at least some of its various sub-components may be a separate and distinct component in accordance with various aspects of the present disclosure. In other examples, the data attribution component 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The reception component 520 may receive a set of data attribute patterns for a data set including a set of data objects, where the set of data attribute patterns are determined based on a FP analysis of the data set.

The identification component 525 may identify a resulting data attribute for analysis.

The determination component 530 may determine, based on the set of data attribute patterns and the resulting data attribute, a set of input data attributes corresponding to the resulting data attribute for analysis.

The removal component 535 may remove at least one input data attribute from the set of input data attributes, where removing the at least one input data attribute results in a subset of input data attributes.

The calculation component 540 may calculate a probability change corresponding to a difference between a probability that the set of input data attributes corresponds to the resulting data attribute and a probability that the subset of input data attributes corresponds to the resulting data attribute.

The assignment component 545 may assign an attribution value to the at least one input data attribute based on calculating the probability change, where the attribution value indicates a probability that the at least one input data attribute corresponds to the resulting data attribute.

The output module 550 may manage output signals for the apparatus 505. For example, the output module 550 may receive signals from other components of the apparatus 505, such as the data attribution component 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
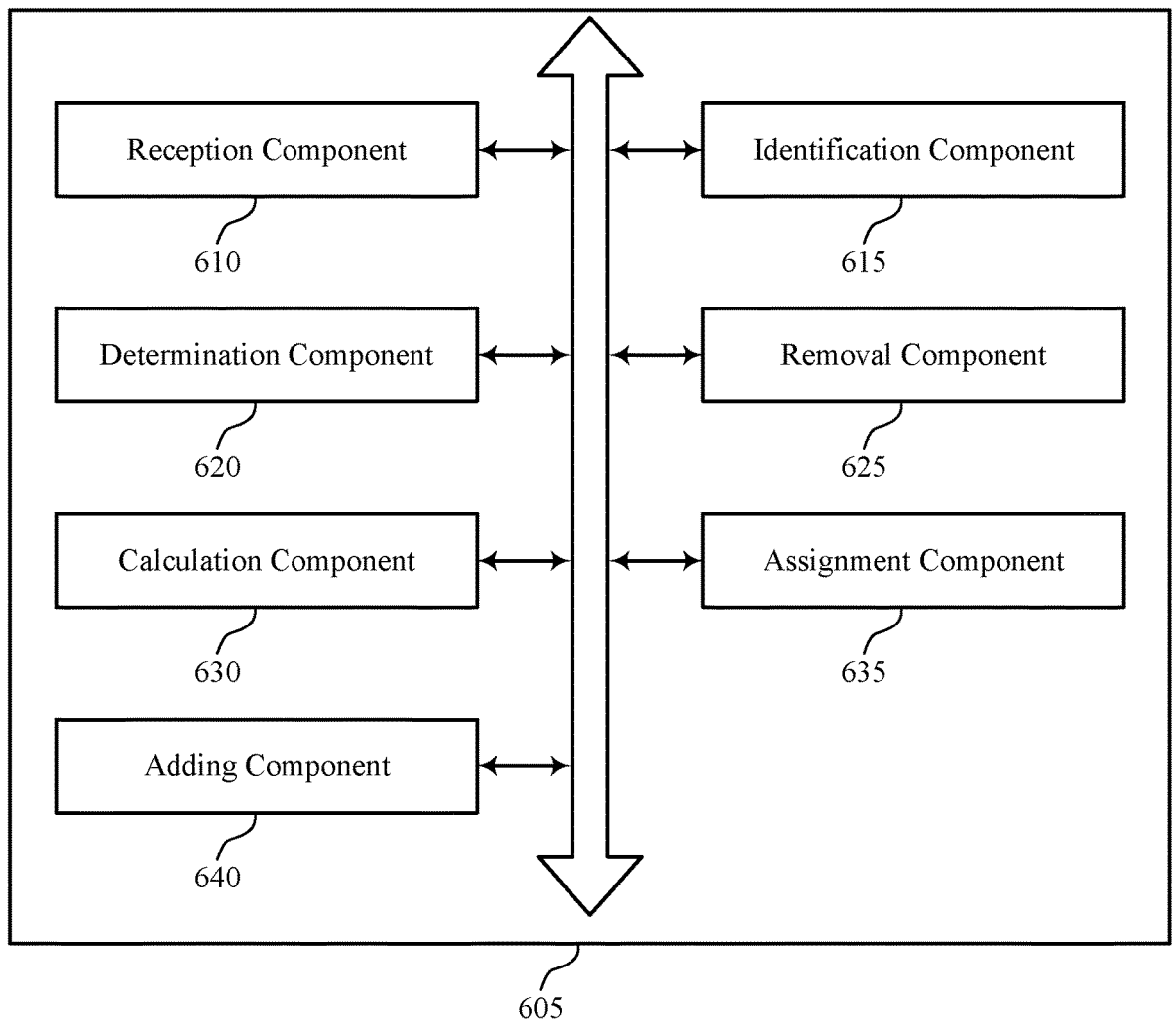
FIG. 6 shows a block diagram of a data attribution component that supports data attribution using frequent pattern analysis in accordance with aspects of the present disclosure.

FIG. 6 shows a block diagram 600 of a data attribution component 605 that supports data attribution using frequent pattern analysis in accordance with aspects of the present disclosure. The data attribution component 605 may be an example of aspects of a data attribution component 515 or a data attribution component 710 described herein. The data attribution component 605 may include a reception component 610, an identification component 615, a determination component 620, a removal component 625, a calculation component 630, an assignment component 635, and an adding component 640. Each of these modules may communicate, directly or indirectly, with one another (e.g., via one or more buses).

The reception component 610 may receive a set of data attribute patterns for a data set including a set of data objects, where the set of data attribute patterns are determined based on a FP analysis of the data set. In some examples, the reception component 610 may receive an indication whether to select the set of input data attributes with the greatest positive probability change value or the greatest negative probability change value.

The identification component 615 may identify a resulting data attribute for analysis. In some examples, the identification component 615 may identify a combination of input data attributes from the set of input data attributes, where the combination of input data attributes are identified based on a common characteristic corresponding to the resulting data attribute for analysis. In some examples, the identification component 615 may identify, from a set of sets of input data attributes, the set of input data attributes with a greatest positive probability change value or a greatest negative probability change value.

The determination component 620 may determine, based on the set of data attribute patterns and the resulting data attribute, a set of input data attributes corresponding to the resulting data attribute for analysis.

The removal component 625 may remove at least one input data attribute from the set of input data attributes, where removing the at least one input data attribute results in a subset of input data attributes. In some examples, the removal component 625 may remove an additional input data attribute from the set of input data attributes, where removing the at least one input data attribute results in a second subset of input data attributes. In some examples, the removal component 625 may remove the combination of input data attributes from the set of input data attributes. In some examples, removing the combination of input data attributes from the set of input data attributes includes removing every combination of input data attributes from the set of input data attributes.

The calculation component 630 may calculate a probability change corresponding to a difference between a probability that the set of input data attributes corresponds to the resulting data attribute and a probability that the subset of input data attributes corresponds to the resulting data attribute. In some examples, the calculation component 630 may calculate a probability change corresponding to a difference between a probability that the set of input data attributes corresponds to the resulting data attribute and a probability that the second subset of input data attributes corresponds to the resulting data attribute. In some examples, the calculation component 630 may calculate a probability change corresponding to a difference between a probability that the set of input data attributes corresponds to the resulting data attribute and a probability that the combination of input data attributes corresponds to the resulting data attribute.

In some cases, a sum of the attribution value assigned to the at least one input data attribute and the attribution value assigned to the at least one additional input data attribute is equivalent to a total probability that the at least one input data attribute and the at least one additional input data attribute correspond to the resulting data attribute. In some cases, the set of input data attributes corresponding to the resulting data attribute for analysis is based on a probability that each corresponding input data attribute is associated with the resulting data attribute.

The assignment component 635 may assign an attribution value to the at least one input data attribute based on calculating the probability change, where the attribution value indicates a probability that the at least one input data attribute corresponds to the resulting data attribute. In some examples, the assignment component 635 may assign an attribution value to the at least one additional input data attribute based on calculating the probability change. In some examples, the assignment component 635 may assign an attribution value to each input data attribute of the combination of input data attributes based on calculating the probability change.

The adding component 640 may add the at least one removed input data attribute to the set of input data attributes after assigning the attribution value. In some examples, the adding component 640 may add each input data attribute of the combination of input data attributes to the set of input data attributes after assigning each attribution value.

Figure 7:
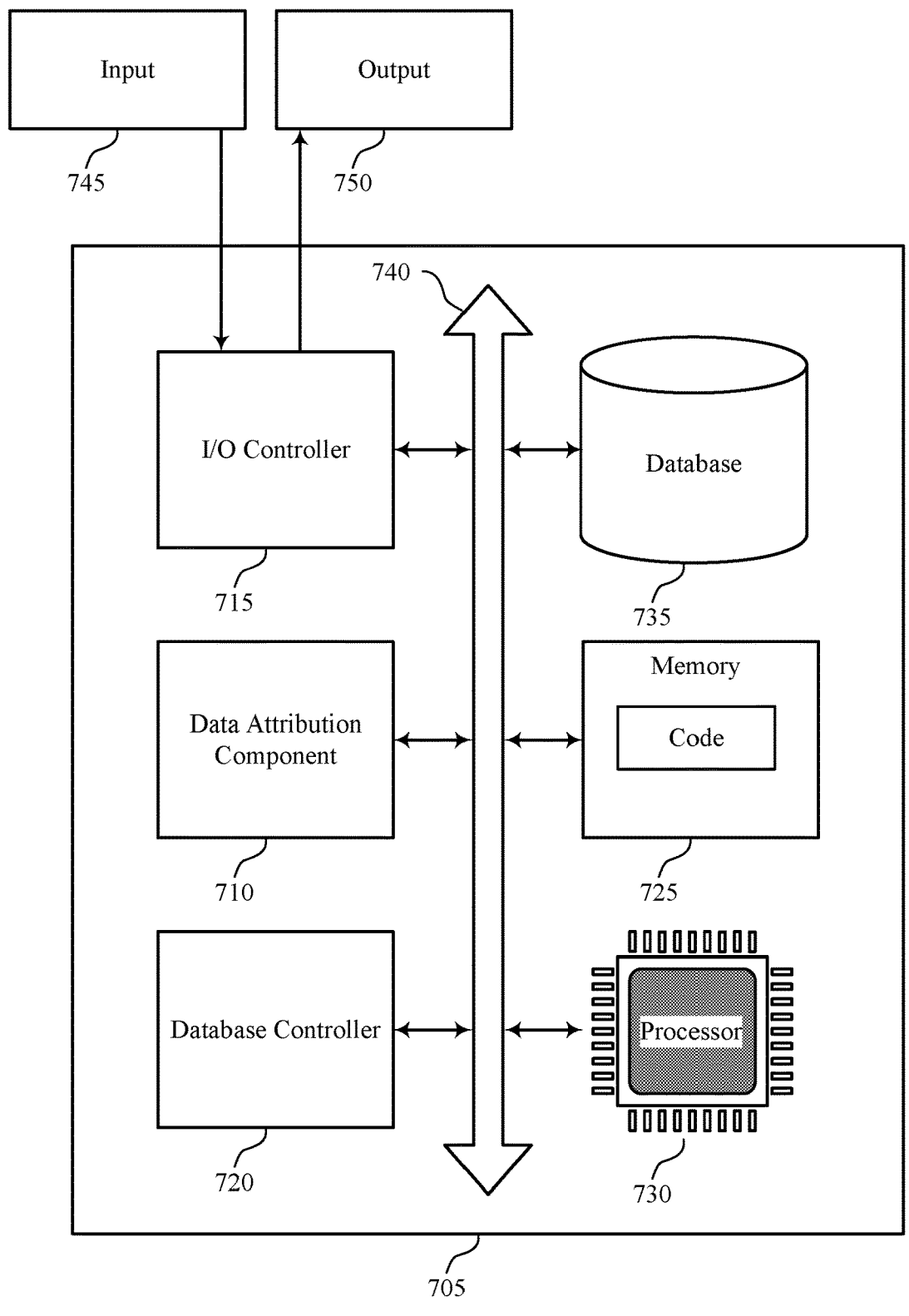
FIG. 7 shows a diagram of a system including a device that supports data attribution using frequent pattern analysis in accordance with aspects of the present disclosure.

FIG. 7 shows a diagram of a system 700 including a device 705 that supports data attribution using frequent pattern analysis in accordance with aspects of the present disclosure. The device 705 may be an example of or include the components of a database server or an apparatus 505 as described herein. The device 705 may include components for bi-directional data communications including components for transmitting and receiving communications, including a data attribution component 710, an I/O controller 715, a database controller 720, memory 725, a processor 730, and a database 735. These components may be in electronic communication via one or more buses (e.g., bus 740).

The data attribution component 710 may be an example of a data attribution component 515 or 605 as described herein. For example, the data attribution component 710 may perform any of the methods or processes described above with reference to FIGS. 5 and 6. In some cases, the data attribution component 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software (e.g., code) including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting data attribution using frequent pattern analysis).

Figure 8:
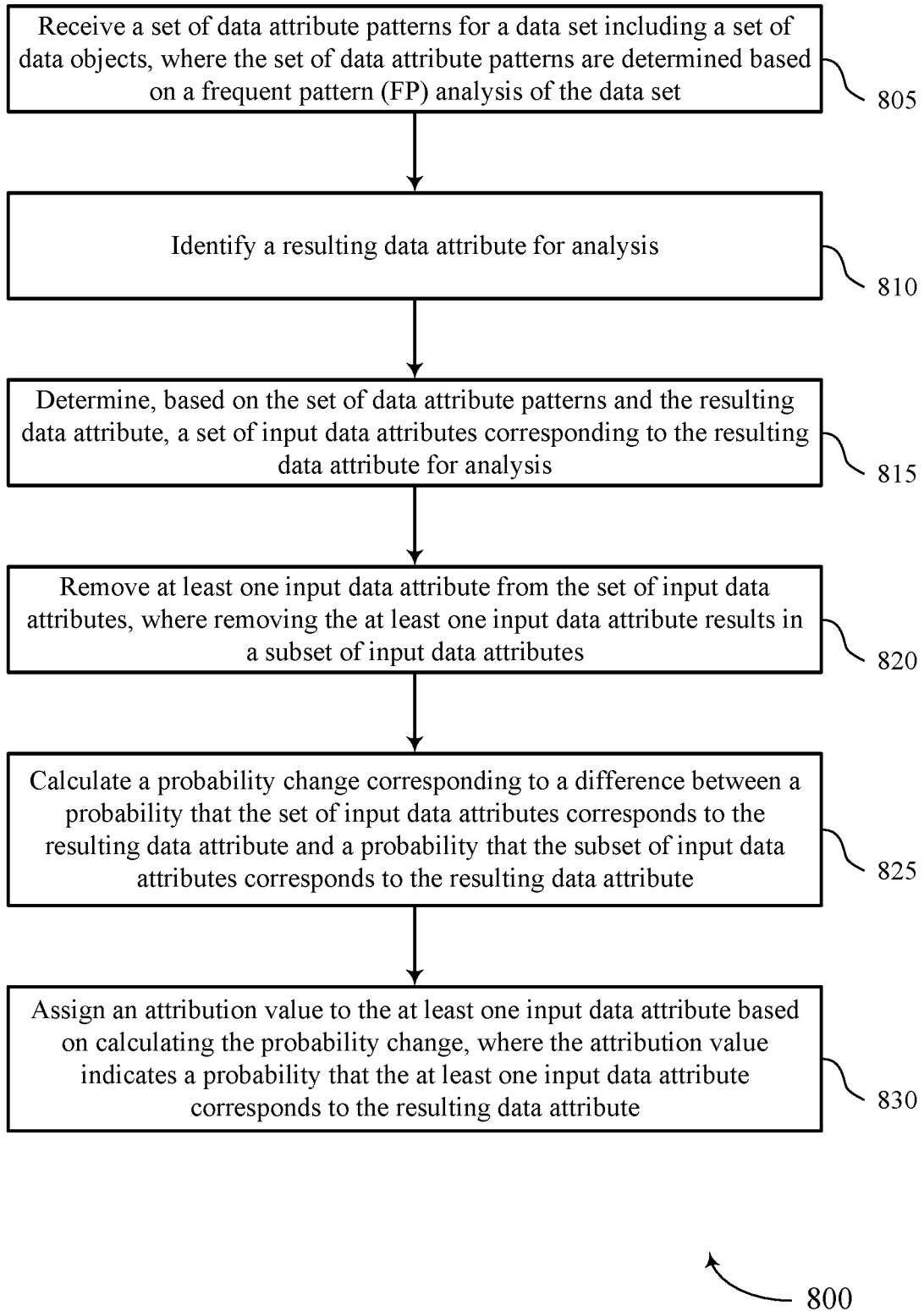
FIGS. 8 through 10 show flowcharts illustrating methods that support data attribution using frequent pattern analysis in accordance with aspects of the present disclosure.

FIG. 8 shows a flowchart illustrating a method 800 that supports data attribution using frequent pattern analysis in accordance with aspects of the present disclosure. The operations of method 800 may be implemented by a database server or its components as described herein. For example, the operations of method 800 may be performed by a data attribution component as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 805, the database server may receive a set of data attribute patterns for a data set including a set of data objects, where the set of data attribute patterns are determined based on a FP analysis of the data set. The operations of 805 may be performed according to the methods described herein. In some examples, aspects of the operations of 805 may be performed by a reception component as described with reference to FIGS. 5 through 7.

At 810, the database server may identify a resulting data attribute for analysis. The operations of 810 may be performed according to the methods described herein. In some examples, aspects of the operations of 810 may be performed by an identification component as described with reference to FIGS. 5 through 7.

At 815, the database server may determine, based on the set of data attribute patterns and the resulting data attribute, a set of input data attributes corresponding to the resulting data attribute for analysis. The operations of 815 may be performed according to the methods described herein. In some examples, aspects of the operations of 815 may be performed by a determination component as described with reference to FIGS. 5 through 7.

At 820, the database server may remove at least one input data attribute from the set of input data attributes, where removing the at least one input data attribute results in a subset of input data attributes. The operations of 820 may be performed according to the methods described herein. In some examples, aspects of the operations of 820 may be performed by a removal component as described with reference to FIGS. 5 through 7.

At 825, the database server may calculate a probability change corresponding to a difference between a probability that the set of input data attributes corresponds to the resulting data attribute and a probability that the subset of input data attributes corresponds to the resulting data attribute. The operations of 825 may be performed according to the methods described herein. In some examples, aspects of the operations of 825 may be performed by a calculation component as described with reference to FIGS. 5 through 7.

At 830, the database server may assign an attribution value to the at least one input data attribute based on calculating the probability change, where the attribution value indicates a probability that the at least one input data attribute corresponds to the resulting data attribute. The operations of 830 may be performed according to the methods described herein. In some examples, aspects of the operations of 830 may be performed by an assignment component as described with reference to FIGS. 5 through 7.

Figure 9:
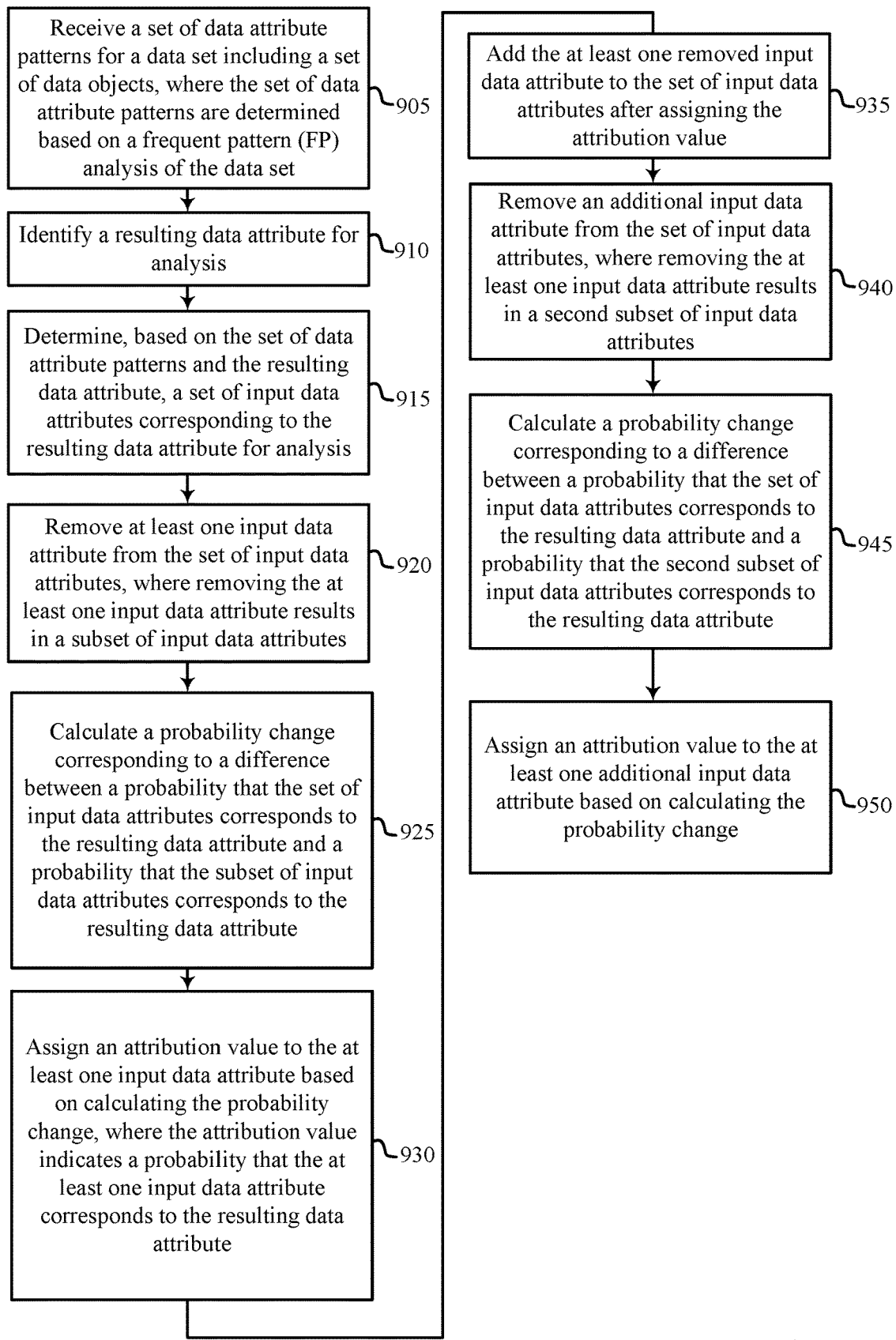

FIG. 9 shows a flowchart illustrating a method 900 that supports data attribution using frequent pattern analysis in accordance with aspects of the present disclosure. The operations of method 900 may be implemented by a database server or its components as described herein. For example, the operations of method 900 may be performed by a data attribution component as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 905, the database server may receive a set of data attribute patterns for a data set including a set of data objects, where the set of data attribute patterns are determined based on a FP analysis of the data set. The operations of 905 may be performed according to the methods described herein. In some examples, aspects of the operations of 905 may be performed by a reception component as described with reference to FIGS. 5 through 7.

At 910, the database server may identify a resulting data attribute for analysis. The operations of 910 may be performed according to the methods described herein. In some examples, aspects of the operations of 910 may be performed by an identification component as described with reference to FIGS. 5 through 7.

At 915, the database server may determine, based on the set of data attribute patterns and the resulting data attribute, a set of input data attributes corresponding to the resulting data attribute for analysis. The operations of 915 may be performed according to the methods described herein. In some examples, aspects of the operations of 915 may be performed by a determination component as described with reference to FIGS. 5 through 7.

At 920, the database server may remove at least one input data attribute from the set of input data attributes, where removing the at least one input data attribute results in a subset of input data attributes. The operations of 920 may be performed according to the methods described herein. In some examples, aspects of the operations of 920 may be performed by a removal component as described with reference to FIGS. 5 through 7.

At 925, the database server may calculate a probability change corresponding to a difference between a probability that the set of input data attributes corresponds to the resulting data attribute and a probability that the subset of input data attributes corresponds to the resulting data attribute. The operations of 925 may be performed according to the methods described herein. In some examples, aspects of the operations of 925 may be performed by a calculation component as described with reference to FIGS. 5 through 7.

At 930, the database server may assign an attribution value to the at least one input data attribute based on calculating the probability change, where the attribution value indicates a probability that the at least one input data attribute corresponds to the resulting data attribute. The operations of 930 may be performed according to the methods described herein. In some examples, aspects of the operations of 930 may be performed by an assignment component as described with reference to FIGS. 5 through 7.

At 935, the database server may add the at least one removed input data attribute to the set of input data attributes after assigning the attribution value. The operations of 935 may be performed according to the methods described herein. In some examples, aspects of the operations of 935 may be performed by an adding component as described with reference to FIGS. 5 through 7.

At 940, the database server may remove an additional input data attribute from the set of input data attributes, where removing the at least one input data attribute results in a second subset of input data attributes. The operations of 940 may be performed according to the methods described herein. In some examples, aspects of the operations of 940 may be performed by a removal component as described with reference to FIGS. 5 through 7.

At 945, the database server may calculate a probability change corresponding to a difference between a probability that the set of input data attributes corresponds to the resulting data attribute and a probability that the second subset of input data attributes corresponds to the resulting data attribute. The operations of 945 may be performed according to the methods described herein. In some examples, aspects of the operations of 945 may be performed by a calculation component as described with reference to FIGS. 5 through 7.

At 950, the database server may assign an attribution value to the at least one additional input data attribute based on calculating the probability change. The operations of 950 may be performed according to the methods described herein. In some examples, aspects of the operations of 950 may be performed by an assignment component as described with reference to FIGS. 5 through 7.

Figure 10:
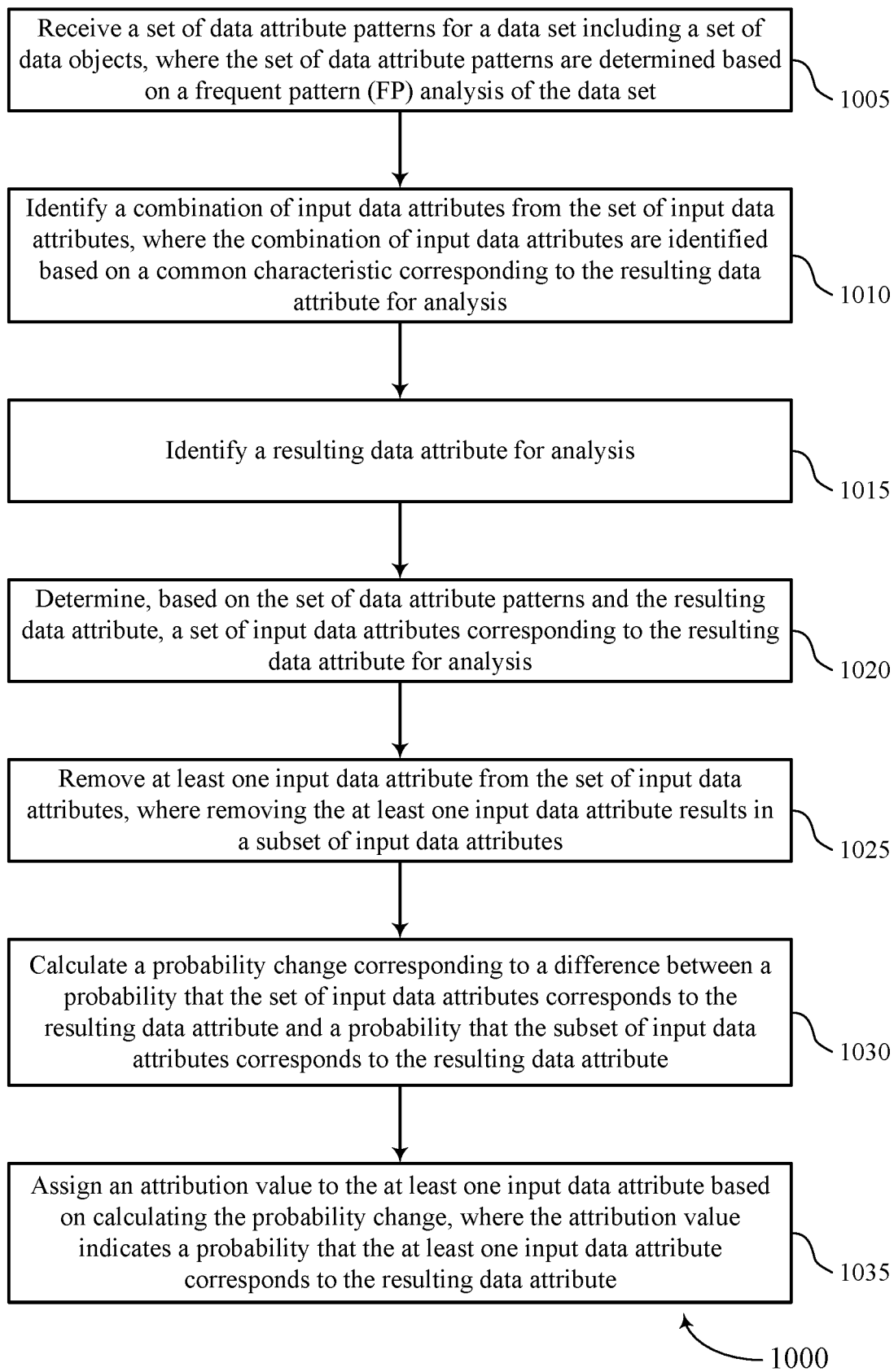

FIG. 10 shows a flowchart illustrating a method 1000 that supports data attribution using frequent pattern analysis in accordance with aspects of the present disclosure. The operations of method 1000 may be implemented by a database server or its components as described herein. For example, the operations of method 1000 may be performed by a data attribution component as described with reference to FIGS. 5 through 7. In some examples, a database server may execute a set of instructions to control the functional elements of the database server to perform the functions described below. Additionally or alternatively, a database server may perform aspects of the functions described below using special-purpose hardware.

At 1005, the database server may receive a set of data attribute patterns for a data set including a set of data objects, where the set of data attribute patterns are determined based on a FP analysis of the data set. The operations of 1005 may be performed according to the methods described herein. In some examples, aspects of the operations of 1005 may be performed by a reception component as described with reference to FIGS. 5 through 7.

At 1010, the database server may identify a combination of input data attributes from the set of input data attributes, where the combination of input data attributes are identified based on a common characteristic corresponding to the resulting data attribute for analysis. The operations of 1010 may be performed according to the methods described herein. In some examples, aspects of the operations of 1010 may be performed by an identification component as described with reference to FIGS. 5 through 7.

At 1015, the database server may identify a resulting data attribute for analysis. The operations of 1015 may be performed according to the methods described herein. In some examples, aspects of the operations of 1015 may be performed by an identification component as described with reference to FIGS. 5 through 7.

At 1020, the database server may determine, based on the set of data attribute patterns and the resulting data attribute, a set of input data attributes corresponding to the resulting data attribute for analysis. The operations of 1020 may be performed according to the methods described herein. In some examples, aspects of the operations of 1020 may be performed by a determination component as described with reference to FIGS. 5 through 7.

At 1025, the database server may remove at least one input data attribute from the set of input data attributes, where removing the at least one input data attribute results in a subset of input data attributes. The operations of 1025 may be performed according to the methods described herein. In some examples, aspects of the operations of 1025 may be performed by a removal component as described with reference to FIGS. 5 through 7.

At 1030, the database server may calculate a probability change corresponding to a difference between a probability that the set of input data attributes corresponds to the resulting data attribute and a probability that the subset of input data attributes corresponds to the resulting data attribute. The operations of 1030 may be performed according to the methods described herein. In some examples, aspects of the operations of 1030 may be performed by a calculation component as described with reference to FIGS. 5 through 7.

At 1035, the database server may assign an attribution value to the at least one input data attribute based on calculating the probability change, where the attribution value indicates a probability that the at least one input data attribute corresponds to the resulting data attribute. The operations of 1035 may be performed according to the methods described herein. In some examples, aspects of the operations of 1035 may be performed by an assignment component as described with reference to FIGS. 5 through 7.

A method for data attribution at a database system is described. The method may include receiving a set of data attribute patterns for a data set including a set of data objects, where the set of data attribute patterns are determined based on a FP analysis of the data set, identifying a resulting data attribute for analysis, determining, based on the set of data attribute patterns and the resulting data attribute, a set of input data attributes corresponding to the resulting data attribute for analysis, removing at least one input data attribute from the set of input data attributes, where removing the at least one input data attribute results in a subset of input data attributes, calculating a probability change corresponding to a difference between a probability that the set of input data attributes corresponds to the resulting data attribute and a probability that the subset of input data attributes corresponds to the resulting data attribute, and assigning an attribution value to the at least one input data attribute based on calculating the probability change, where the attribution value indicates a probability that the at least one input data attribute corresponds to the resulting data attribute.

An apparatus for data attribution at a database system is described. The apparatus may include a processor, memory in electronic communication with the processor, and instructions stored in the memory. The instructions may be executable by the processor to cause the apparatus to receive a set of data attribute patterns for a data set including a set of data objects, where the set of data attribute patterns are determined based on a FP analysis of the data set, identify a resulting data attribute for analysis, determine, based on the set of data attribute patterns and the resulting data attribute, a set of input data attributes corresponding to the resulting data attribute for analysis, remove at least one input data attribute from the set of input data attributes, where removing the at least one input data attribute results in a subset of input data attributes, calculate a probability change corresponding to a difference between a probability that the set of input data attributes corresponds to the resulting data attribute and a probability that the subset of input data attributes corresponds to the resulting data attribute, and assign an attribution value to the at least one input data attribute based on calculating the probability change, where the attribution value indicates a probability that the at least one input data attribute corresponds to the resulting data attribute.

Another apparatus for data attribution at a database system is described. The apparatus may include means for receiving a set of data attribute patterns for a data set including a set of data objects, where the set of data attribute patterns are determined based on a FP analysis of the data set, identifying a resulting data attribute for analysis, determining, based on the set of data attribute patterns and the resulting data attribute, a set of input data attributes corresponding to the resulting data attribute for analysis, removing at least one input data attribute from the set of input data attributes, where removing the at least one input data attribute results in a subset of input data attributes, calculating a probability change corresponding to a difference between a probability that the set of input data attributes corresponds to the resulting data attribute and a probability that the subset of input data attributes corresponds to the resulting data attribute, and assigning an attribution value to the at least one input data attribute based on calculating the probability change, where the attribution value indicates a probability that the at least one input data attribute corresponds to the resulting data attribute.

A non-transitory computer-readable medium storing code for data attribution at a database system is described. The code may include instructions executable by a processor to receive a set of data attribute patterns for a data set including a set of data objects, where the set of data attribute patterns are determined based on a FP analysis of the data set, identify a resulting data attribute for analysis, determine, based on the set of data attribute patterns and the resulting data attribute, a set of input data attributes corresponding to the resulting data attribute for analysis, remove at least one input data attribute from the set of input data attributes, where removing the at least one input data attribute results in a subset of input data attributes, calculate a probability change corresponding to a difference between a probability that the set of input data attributes corresponds to the resulting data attribute and a probability that the subset of input data attributes corresponds to the resulting data attribute, and assign an attribution value to the at least one input data attribute based on calculating the probability change, where the attribution value indicates a probability that the at least one input data attribute corresponds to the resulting data attribute.

Some examples of the method, apparatuses, and non-transitory computer-readable medium described herein may further include operations, features, means, or instructions for adding the at least one removed input data attribute to the set of input data attributes after assigning the attribution value, removing an additional input data attribute from the set of input data attributes, where removing the at least one input data attribute results in a second subset of input data attributes, calculating a probability change corresponding to a difference between a probability that the set of input data attributes corresponds to the resulting data attribute and a probability that the second subset of input data attributes corresponds to the resulting data attribute and assigning an attribution value to the at least one additional input data attribute based on calculating the probability change.

In some examples of the method, apparatuses, and non-transitory computer-readable medium described herein, a sum of the attribution value assigned to the at least one input data attribute and the attribution value assigned to the at least one additional input data attribute may be equivalent to a total probability that the at least one input data attribute and the at least one additional input data attribute correspond to the resulting data attribute.

Some examples of the method, apparatuses, and non-transitory computer-readable medium described herein may further include operations, features, means, or instructions for identifying a combination of input data attributes from the set of input data attributes, where the combination of input data attributes may be identified based on a common characteristic corresponding to the resulting data attribute for analysis.

Some examples of the method, apparatuses, and non-transitory computer-readable medium described herein may further include operations, features, means, or instructions for removing the combination of input data attributes from the set of input data attributes, calculating a probability change corresponding to a difference between a probability that the set of input data attributes corresponds to the resulting data attribute and a probability that the combination of input data attributes corresponds to the resulting data attribute, assigning an attribution value to each input data attribute of the combination of input data attributes based on calculating the probability change and adding each input data attribute of the combination of input data attributes to the set of input data attributes after assigning each attribution value.

In some examples of the method, apparatuses, and non-transitory computer-readable medium described herein, removing the combination of input data attributes from the set of input data attributes may include operations, features, means, or instructions for removing every combination of input data attributes from the set of input data attributes.

In some examples of the method, apparatuses, and non-transitory computer-readable medium described herein, determining the set of input data attributes corresponding to the resulting data attribute for analysis may include operations, features, means, or instructions for identifying, from a set of sets of input data attributes, the set of input data attributes with a greatest positive probability change value or a greatest negative probability change value.

Some examples of the method, apparatuses, and non-transitory computer-readable medium described herein may further include operations, features, means, or instructions for receiving an indication whether to select the set of input data attributes with the greatest positive probability change value or the greatest negative probability change value.

In some examples of the method, apparatuses, and non-transitory computer-readable medium described herein, the set of input data attributes corresponding to the resulting data attribute for analysis may be based on a probability that each corresponding input data attribute may be associated with the resulting data attribute.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data attribution at a database system, comprising:

performing a frequent pattern (FP) analysis of a data set comprising a plurality of data objects, the FP analysis comprising converting the data set into a condensed data structure for FP mining, wherein a set of data attribute patterns is determined based at least in part on the FP mining of the condensed data structure;

receiving a user input indicating a resulting data attribute for an attribution analysis based at least in part on the FP analysis, the resulting data attribute included in at least one data attribute pattern of the set of data attribute patterns;

determining, based at least in part on the set of data attribute patterns and the user input indicating the resulting data attribute, a set of input data attributes corresponding to the resulting data attribute for the attribution analysis, wherein the set of input data attributes are different from the resulting data attribute and are included in the at least one data attribute pattern;

removing at least one input data attribute from the set of input data attributes, wherein removing the at least one input data attribute results in a subset of input data attributes;

calculating, for the attribution analysis, a probability change corresponding to a difference between a probability that the set of input data attributes corresponds to the resulting data attribute and a probability that the subset of input data attributes corresponds to the resulting data attribute; and assigning an attribution value to the at least one input data attribute based at least in part on calculating the probability change and the FP analysis, wherein the attribution value indicates a probability that the at least one input data attribute corresponds to the resulting data attribute.

2. The method of claim 1, further comprising:

adding the at least one removed input data attribute to the set of input data attributes after assigning the attribution value;

removing at least one additional input data attribute from the set of input data attributes, wherein removing the at least one additional input data attribute results in a second subset of input data attributes;

calculating a second probability change corresponding to a second difference between the probability that the set of input data attributes corresponds to the resulting data attribute and a probability that the second subset of input data attributes corresponds to the resulting data attribute; and assigning a second attribution value to the at least one additional input data attribute based at least in part on calculating the second probability change.

3. The method of claim 2, wherein a sum of the attribution value assigned to the at least one input data attribute and the second attribution value assigned to the at least one additional input data attribute is equivalent to a total probability that the at least one input data attribute and the at least one additional input data attribute correspond to the resulting data attribute.

4. The method of claim 1, further comprising:

identifying a combination of input data attributes from the set of input data attributes, wherein the combination of input data attributes are identified based at least in part on a common characteristic corresponding to the resulting data attribute for the attribution analysis.

5. The method of claim 4, further comprising:

removing the combination of input data attributes from the set of input data attributes;

calculating a third probability change corresponding to a third difference between the probability that the set of input data attributes corresponds to the resulting data attribute and a probability that the combination of input data attributes corresponds to the resulting data attribute;

assigning a third attribution value to each input data attribute of the combination of input data attributes based at least in part on calculating the third probability change; and adding each input data attribute of the combination of input data attributes to the set of input data attributes after assigning the third attribution value to each input data attribute of the combination of input data attributes.

6. The method of claim 5, wherein:

removing the combination of input data attributes from the set of input data attributes comprises removing every combination of input data attributes from the set of input data attributes.

7. The method of claim 1, wherein determining the set of input data attributes corresponding to the resulting data attribute for the attribution analysis comprises:

identifying, from a plurality of sets of input data attributes, the set of input data attributes with a greatest positive probability change value or a greatest negative probability change value.

8. The method of claim 7, further comprising:

receiving an indication whether to select the set of input data attributes with the greatest positive probability change value or the greatest negative probability change value.

9. The method of claim 1, wherein the set of input data attributes corresponding to the resulting data attribute for the attribution analysis is based at least in part on a probability that each corresponding input data attribute is associated with the resulting data attribute.

10. The method of claim 1, wherein the data set comprises a superset of data attribute patterns, and wherein the set of data attribute patterns is based at least in part on a number of occurrences of each data attribute pattern of the set of data attribute patterns.

11. The method of claim 1, wherein the probability change is calculated based at least in part on using a Shapley value.

12. An apparatus for data attribution at a database system, comprising:

a processor, memory in electronic communication with the processor; and instructions stored in the memory and executable by the processor to cause the apparatus to:

perform a frequent pattern (FP) analysis of a data set comprising a plurality of data objects, the FP Analysis comprising converting the data set into a condensed data structure for FP mining, wherein a set of data attribute patterns is determined based at least in part on the FP mining of the condensed data structure;

receive a user input indicating a resulting data attribute for an attribution analysis based at least in part on the FP analysis, the resulting data attribute included in at least one data attribute pattern of the set of data attribute patterns;

determine, based at least in part on the set of data attribute patterns and the user input indicating the resulting data attribute, a set of input data attributes corresponding to the resulting data attribute for the attribution analysis, wherein the set of input data attributes are different from the resulting data attribute and are included in the at least one data attribute pattern;

remove at least one input data attribute from the set of input data attributes, wherein removing the at least one input data attribute results in a subset of input data attributes;

calculate, for the attribution analysis, a probability change corresponding to a difference between a probability that the set of input data attributes corresponds to the resulting data attribute and a probability that the subset of input data attributes corresponds to the resulting data attribute; and assign an attribution value to the at least one input data attribute based at least in part on calculating the probability change and the FP analysis, wherein the attribution value indicates a probability that the at least one input data attribute corresponds to the resulting data attribute.

13. The apparatus of claim 12, wherein the instructions are further executable by the processor to cause the apparatus to:

add the at least one removed input data attribute to the set of input data attributes after assigning the attribution value;
remove at least one additional input data attribute from the set of input data attributes, wherein removing the at least one additional input data attribute results in a second subset of input data attributes;
calculate a second probability change corresponding to a second difference between the probability that the set of input data attributes corresponds to the resulting data attribute and a probability that the second subset of input data attributes corresponds to the resulting data attribute; and
assign a second attribution value to the at least one additional input data attribute based at least in part on calculating the second probability change.

14. The apparatus of claim 13, wherein a sum of the attribution value assigned to the at least one input data attribute and the second attribution value assigned to the at least one additional input data attribute is equivalent to a total probability that the at least one input data attribute and the at least one additional input data attribute correspond to the resulting data attribute.

15. The apparatus of claim 12, wherein the instructions are further executable by the processor to cause the apparatus to:
identify a combination of input data attributes from the set of input data attributes, wherein the combination of input data attributes are identified based at least in part on a common characteristic corresponding to the resulting data attribute for the attribution analysis.

16. The apparatus of claim 15, wherein the instructions are further executable by the processor to cause the apparatus to:
remove the combination of input data attributes from the set of input data attributes;
calculate a third probability change corresponding to a third difference between the probability that the set of input data attributes corresponds to the resulting data attribute and a probability that the combination of input data attributes corresponds to the resulting data attribute;
assign a third attribution value to each input data attribute of the combination of input data attributes based at least in part on calculating the third probability change; and
add each input data attribute of the combination of input data attributes to the set of input data attributes after assigning the third attribution value to each input data attribute of the combination of input data attributes.

17. The apparatus of claim 16, wherein the instructions to remove the combination of input data attributes from the set of input data attributes are executable by the processor to cause the apparatus to remove every combination of input data attributes from the set of input data attributes.

18. The apparatus of claim 12, wherein the instructions to determine the set of input data attributes corresponding to the resulting data attribute for the attribution analysis are executable by the processor to cause the apparatus to:
identify, from a plurality of sets of input data attributes, the set of input data attributes with a greatest positive probability change value or a greatest negative probability change value.

19. A non-transitory computer-readable medium storing code for data attribution at a database system, the code comprising instructions executable by a processor to:
perform a frequent pattern (FP) analysis of a data set comprising a plurality of data objects, the FP analysis comprising converting the data set into a condensed data structure for FP mining, wherein a set of data attribute patterns is determined based at least in part on the FP mining of the condensed data structure;
receive a user input indicating a resulting data attribute for an attribution analysis based at least in part on the FP analysis, the resulting data attribute included in at least one data attribute pattern of the set of data attribute patterns;
determine, based at least in part on the set of data attribute patterns and the user input indicating the resulting data attribute, a set of input data attributes corresponding to the resulting data attribute for the attribution analysis, wherein the set of input data attributes are different from the resulting data attribute and are included in the at least one data attribute pattern;
remove at least one input data attribute from the set of input data attributes, wherein removing the at least one input data attribute results in a subset of input data attributes;
calculate, for the attribution analysis, a probability change corresponding to a difference between a probability that the set of input data attributes corresponds to the resulting data attribute and a probability that the subset of input data attributes corresponds to the resulting data attribute; and
assign an attribution value to the at least one input data attribute based at least in part on calculating the probability change and the FP analysis, wherein the attribution value indicates a probability that the at least one input data attribute corresponds to the resulting data attribute.

20. The non-transitory computer-readable medium of claim 19, wherein the instructions are further executable to:
add the at least one removed input data attribute to the set of input data attributes after assigning the attribution value;
remove at least one additional input data attribute from the set of input data attributes, wherein removing the at least one additional input data attribute results in a second subset of input data attributes;
calculate a second probability change corresponding to a second difference between the probability that the set of input data attributes corresponds to the resulting data attribute and a probability that the second subset of input data attributes corresponds to the resulting data attribute; and
assign a second attribution value to the at least one additional input data attribute based at least in part on calculating the second probability change.

* * * * *